United States Patent [19]

Hardy et al.

[11] 3,811,011

[45] May 14, 1974

[54] MULTIPLE IMAGE REGISTRATION SYSTEM

[75] Inventors: John W. Hardy, Lexington; Donald C. Redpath, Winchester, both of Mass.; Gilbert Hobrough, Vancouver, British Columbia, Canada

[73] Assignee: Itek Corporation, Lexington, Mass.

[22] Filed: July 8, 1969

[21] Appl. No.: 839,940

[52] U.S. Cl. .................... 178/6.8, 178/6.5, 250/558, 356/2, 356/167

[51] Int. Cl. ... G01c 11/18, G01b 11/24, H04n 7/18

[58] Field of Search ........... 178/6.5, 6.8, 7.7; 356/2, 356/167; 250/220 SP, 558

[56] References Cited

UNITED STATES PATENTS

| | | | |
|---|---|---|---|
| 2,274,366 | 2/1942 | Hansen | 178/7.7 |
| 3,643,018 | 2/1972 | Adler | 356/167 |
| 3,473,875 | 10/1969 | Bertram | 356/2 |
| 3,432,674 | 3/1969 | Hobrough | 250/220 SP |
| 2,817,787 | 12/1957 | Kovasznay | 178/7.7 |

*Primary Examiner*—Howard W. Britton
*Attorney, Agent, or Firm*—Homer O. Blair; Robert L. Nathans; William C. Roch

[57] ABSTRACT

A multiple image registration system utilizing scanning patterns with orthogonally related scanning paths parallel to the directions of transformation introduced for correcting *x* and *y*-parallax. A cross-correlation signal indicative of correlation quality is separated into *x* and *y*-components uniquely representing correlation quality in each direction of scan. The separate components are used appropriately to effect relevant control of raster size, model profiling velocity, and both loop gains and operability of *x* and *y*-parallax transformation mechanisms.

35 Claims, 17 Drawing Figures

INVENTORS:
JOHN W. HARDY,
DONALD C. REDPATH,
GILBERT L. HOBROUGH,

BY John E. Toupal
ATTORNEY

INVENTORS:
JOHN W. HARDY,
DONALD C. REDPATH,
GILBERT L. HOBROUGH,
BY John E. Toupal
ATTORNEY

INVENTORS:
JOHN W. HARDY,
DONALD C. REDPATH,
GILBERT L. HOBROUGH,

BY John E. Toupal ATTORNEY

INVENTORS:
JOHN W. HARDY,
DONALD C. REDPATH,
GILBERT L. HOBROUGH,
BY John E. Toupal ATTORNEY INVENTORS:
JOHN W. HARDY,
DONALD C. REDPATH,
GILBERT L. HOBROUGH,
BY John E. Toupal ATTORNEY

INVENTORS:
JOHN W. HARDY,
DONALD C. REDPATH,
GILBERT L. HOBROUGH,

BY John E. Toupal
ATTORNEY

INVENTORS:
JOHN W. HARDY,
DONALD C. REDPATH,
GILBERT L. HOBROUGH,
BY John E. Toupal
ATTORNEY INVENTORS:
JOHN W. HARDY,
DONALD C. REDPATH,
GILBERT L. HOBROUGH,
BY John E. Toupal
ATTORNEY

INVENTORS:
JOHN W. HARDY,
DONALD C. REDPATH,
GILBERT L. HOBROUGH,

BY John E. Toupal
ATTORNEY

INVENTORS:
JOHN W. HARDY,
DONALD C. REDPATH,
GILBERT L. HOBROUGH,
BY John E. Toupal
ATTORNEY INVENTORS:
JOHN W. HARDY
DONALD C. REDPATH,
GILBERT L. HOBROUGH,
BY John E. Toupal
ATTORNEY INVENTORS:
JOHN W. HARDY,
DONALD C. REDPATH,
GILBERT L. HOBROUGH
BY John E. Toupal
ATTORNEY

MULTIPLE IMAGE REGISTRATION SYSTEM

BACKGROUND OF THE INVENTION

This invention relates generally to a dual image registration system and, more particularly, relates to an automatically controlled system of that type.

Although not so limited, the present invention is particularly well suited for use with image registration systems employed during the production of topographic maps. Typically, maps of this type are obtained from stereoscopically related photographs taken from airplanes. When the photographs are accurately positioned in locations corresponding to the relative positions in which they were taken, their projection upon a suitable base produces a three-dimensional presentation of the particular terrain imaged on the photographs. However, a coherent stereo presentation is obtained only if the photographs are properly registered, i.e. so positioned that homologous areas in the two projections are aligned and have the same orientation. The problem of image registration is accentuated by the fact that image detail in the photographs typically is not identical in all respects. Such detail non-uniformity is caused, for example, by photographing a scene from different camera viewpoints or by variations in altitude, roll and pitch of the photographic aircraft. The resultant distortion between corresponding areas in the photographs prevents common detail registration when the images retained by both photographs are projected onto a common viewing plane.

A number of systems have been developed for simplifying the registration of dual images. Basically, most such registration systems scan homologous areas in the two images and convert the scanned graphic data into a pair of electrical video signals. By various correlation and analyzation techniques, the video signals are used to produce error signals representing certain types of distortion existing between the scanned images. The scanned areas are then rendered congruent by a transformation mechanism that induces appropriate relative movement and scanning pattern shape adjustment therebetween in response to the derived error signals.

In a typical stereo plotting instrument the similar images retained thereon are analyzed with respect to $x$ and $y$ coordinate axes. Relative image displacement along the axis corresponding to the direction of separation between the positions from which the stereo photographs were taken, commonly called $x$-parallax is corrected, for example, by a servomechanism that produces appropriate relative movement between the stereo plates or by height adjustment of a viewing surface which intercepts a projection of the images. The magnitude of required $x$-parallax correction is directly related to relative elevation of the terrain photographed and provides the contour information necessary for topographic maps. Scale distortion along the other coordinate axis, commonly known as $y$-parallax, and other first and higher order distortions also are corrected in systems providing a visual presentation of the stereo model. These latter types of distortion are corrected, for example, by producing relative changes in the rasters of the scanning devices utilized, by controlling optical devices used for projection of the images, or introducing appropriate relative movement between the stereographic plates. The entire stereo model represented by a single pair of stereographic plates is normally examined by traversing scanning patterns back and forth across the photographs along paths corresponding to the $y$-coordinate direction and incrementally spaced apart in the $x$-coordinate direction. Typical stereo plotting instruments of this type are disclosed, for example, in U.S. Pat. No. 2,964,644 issued on Dec. 13, 1960 to Gilbert Louis Hobrough and in U.S. Pat. No. 3,145,303 issued on Aug. 18, 1964, to the same inventor.

An important problem associated with stereo plotters results from variations in the level of correlation quality experienced during a plotting operation. All aerial photographs have a structure and spatial frequency content that differs from point to point. For this reason the level of information available for correlation is continually varying as the plates are traversed. Various parameters of the correlation process must be correspondingly varied, therefore, if optimum results are to be obtained. For example, although registration accuracy is enhanced by reducing the size of the scanning rasters utilized, the acceptable minimum raster size is determined by correlation quality which is variably dependent upon correlatable image content. Thus, a larger raster size is desired during periods of poor correlation caused either by relative photo displacement or by dissimilar image detail information produced in photographs of rough terrain. An increase in raster size also is desired when scanning photographic images retaining a low level of variable image detail. Similarly, although rapid traversals of the stereo models are desirable in the interest of reduced processing time, the traversal velocity should be reduced during periods requiring large $x$-parallax correction so as to accommodate the inherent reaction time of the servomechanism producing that correction. It is desirable also to reduce traversing velocity when scanning areas of low information content because the correspondingly low values of the resultant error signals limit the rate at which servo corrections can be made.

Another system parameter that is undesirably subject to the type of image detail being scanned is the gain of the servosystem used for controlling $x$-parallax correction. To simplify servo system design, it is desirable that electrical circuit gain be maintained substantially constant. However, gain, which is dependent upon the slope of the raw error signal derived from the video signals, is affected by both the size of the scanning pattern utilized and the level of inherent image detail in the scanned areas.

Previous systems such as those disclosed in the above noted patents have utilized a cross-correlation signal indicative of correlation quality to control certain system parameters including scanning pattern size and traversal velocity. Also known is the control of scanning raster size with signals derived from the $x$-parallax error signal and representative of such factors are terrain roughness and slope. However, the control functions provided by prior image registration systems have not proven fully satisfactory and various deficiencies still exist.

The object of this invention, therefore, is to provide an improved multiple image registration instrument with an automatic control system that alleviates the problems mentioned above.

CHARACTERIZATION OF THE INVENTION

The invention is characterized by the provision of a multiple image registration system comprising electronic scanners for directing scanning patterns onto corresponding areas in a pair of similar images and a signal generator for producing a first analog signal representing variable detail along the path scanned in one of the images and a second analog signal representing variable detail along the path scanned in the other image. The analog signals are correlated to produce an orthogonal correlation signal having an amplitude proportional to the degree of relative image detail misregistration along the scanned paths and used to derive error signals that correct the misregistration. Also produced is a cross-correlation signal having an amplitude proportional to the level of correlatable image detail along the scanned paths. Raster signals that generate continuous scanning paths formed by alternating orthogonally related path segments are formed by a waveform generator that also provides a reference signal that indicates which of the orthogonally related sets of path segments are being scanned. By gating of the cross-correlation signal with the reference signal, an $x$-cross-correlation component is derived proportional to correlatable information present along only one of the orthogonal path sets. The unique correlation quality information present in the $x$-cross-correlation component permits a control circuit to effect various types of directly pertinent control functions.

According to one feature of the invention, the $x$-cross-correlation component is utilized to vary the size of the areas scanned by the electronic scanners. The scanning pattern size is increased in response to an indication of poor correlation so as to help maintain the registration system within its operable limits. Poor correlation can result, for example, because of relative displacement between the compared images or, in the case of typical stereo photographs used in map making, because of dissimilar detail present in images of rough terrain. The scanning area size also is increased to enhance corrective signal output levels during periods wherein the information retained by the compared images is inherently low.

According to a featured embodiment of the invention, the image registration system is of the type generally used for the production of topographic maps and includes a $z$-servo system that corrects $x$-parallax by producing relative rectilinear movement between the compared images in a direction parallel to one of the orthogonally related sets of scanning paths. The measured magnitude of this relative movement required to eliminate $x$-parallax is, of course, indicative of the elevation of the terrain imaged on a pair of stereo photographs.

According to another feature of the invention, the system includes a traversing mechanism that continuously changes the corresponding scanned areas by producing relative movement between the images and the scanning patterns in directions orthogonally related to the relative image movement produced to correct $x$-parallax. The velocity of this scanning pattern traversal is varied by the control circuit also in response to the value of the $x$-cross correlation component. The traversing speed is lowered to reduce the rate at which servo corrections must be made during periods of low correlatable detail in the $x$-parallax direction that result in low values of the $x$-parallax corrective error signals.

Another feature of the invention is the provision of a holding circuit that prevents the $z$-servo mechanism from producing further $x$-parallax corrective action in response to a predetermined condition indicated by the $x$-cross-correlation component. Corrective action is stopped when the absence of a given minimum quality of correlation is indicated by the value of the $x$-cross-correlation component. This prevents uncontrolled action that could produce complete failure of the registration system. Corrective action is automatically reestablished when $x$-direction correlation quality is sufficiently improved as indicated by the value of the $x$-cross-correlation component.

According to another feature of the invention, the loop gain of the $x$-servo mechanism also is varied in response to the value of the $x$-cross-correlation component. By increasing the loop gain during periods of low correlatable image detail, a more uniform gain characteristic is obtained thereby simplifying the design of the servo system itself.

According to still another feature of the invention, the control circuit also varies the gain of the $z$-servo loop in response to changes in the size of the areas scanned in the compared images. Since the value of loop gain is dependent upon the size of the areas scanned, this feature also facilitates the maintenance of a substantially uniform loop gain thereby simplifying circuit design.

Another feature of the invention effects size variations of the scanned areas in response to the value of the orthogonal correlation signal. The scanned areas are reduced in size in response to a low orthogonal correlation signal value thereby increasing the accuracy of the registration system.

According to another feature of the invention, the reference signals generated by the waveform generator are used also to derive from the cross-correlation signal a $y$-component during periods of scan along the other set of scanning path segments. The $y$-cross-correlation component provides unique correlation quality information associated with image detail scanned in only directions corresponding to the other path sets.

Another feature of the invention is the provision of a dual image registration system of the above types including a closed loop $y$-parallax transformation system for producing relative changes in the scanned areas by displacing the scanning pattern produced on at least one of the compared images. Changes are made in response to a $y$-parallax error signal derived from the orthogonal correlation signal. The loop gain of the $y$-parallax transformation system is varied in response to the $y$ cross-correlation component thereby improving loop gain uniformity and simplifying circuit design.

According to still another feature of the invention the holding circuit also prevents the $y$-parallax transformation system from producing further relative scanning pattern changes in response to a given condition indicated by the $y$ cross-correlation component. As in the case of $x$-parallax correction, this prevents uncontrolled action that could produce complete failure of the registration system. Again corrective action is automatically reestablished when $y$-direction correlation quality is sufficiently improved as indicated by the value of the $y$-cross-correlation component.

The invention is characterized further by the provision of an image registration system of the above featured types wherein the raster signals provided by the waveform generator are substantially triangular signals of frequencies $f_1$ and $f_2$ that produce the orthogonally related scanning path segment sets and wherein $f_1/f_2$ expressed in its lowest terms is $p/q$ where $p$ and $q$ are integers and $(p + q)$ is less than 100. By limiting the number of lines in the scanning pattern, a desirable high frame rate can be achieved. In addition, a larger scanning spot can be utilized for a given size scanning raster thereby providing more light for generation of the video signals. Finally, since the object of the invention is to generate transformation error signals rather than to provide a picture, the reduced number of lines is not objectionable.

DESCRIPTION OF THE DRAWINGS

These and other objects and features of the invention will become more apparent upon a perusal of the following specification taken in conjunction with the accompanying drawings wherein.

DESCRIPTION OF THE PREFERRED EMBODIMENTS

Figure 1:
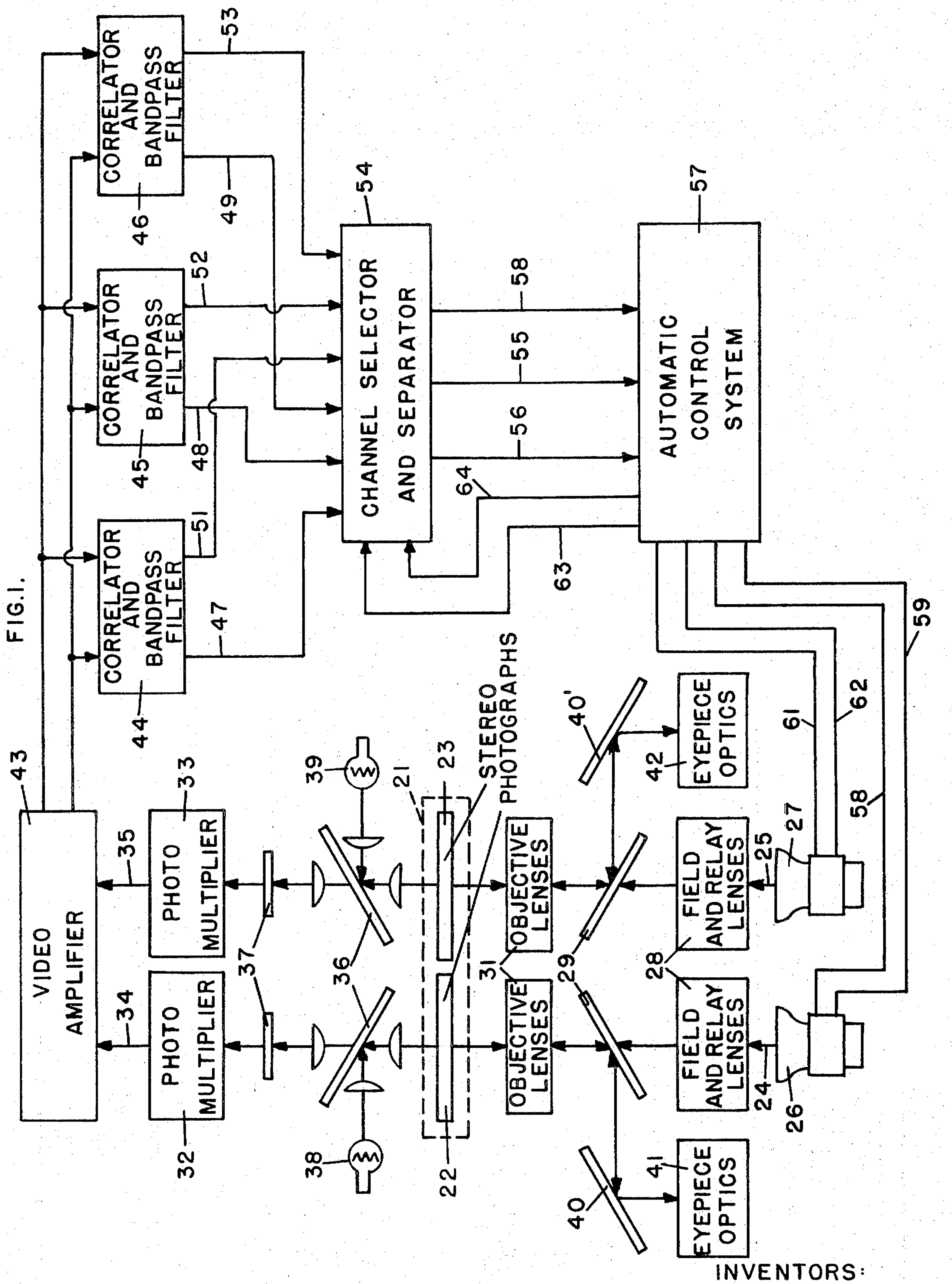
FIG. 1 is a general block diagram illustrating the functional relationship of the main components of the apparatus.

Referring now to FIG. 1 there is shown in block diagram form an image transformation mechanism 21 retaining a pair of stereo photographic transparencies 22 and 23. Scanning beams 24 and 25 produced by, respectively, cathode ray tubes 26 and 27 are directed toward the transparencies 22 and 23 by field and relay lens assemblies 28, dichroic beam splitters 29 and objective lenses 31. After passing through the transparencies 22 and 23 the scanning beams 24 and 25 are received by photomultipliers 32 and 33 that produce on lines 34 and 35, respectively, video analog signals representing the variable detail retained by the photographs. Between the transparencies 22 and 23 and the photomultipliers 32 and 33 the scanning beams pass through lens systems including dichroic mirrors 36 and blue light filters 37.

Also reflected through the transparencies 22 and 23 by the dichroic mirrors 36 is yellow light produced by light sources 38 and 39. After being modulated by the transparencies 22 and 23, the yellow light is directed to a pair of eyepiece optical assemblies 41 and 42 by the objective lenses 31, the dichroic beam splitters 29 and a pair of mirrors 40 and 40'. The eyepiece optical assemblies 41 and 42 provide for a viewer in conventional manner a stereo presentation of the image detail retained by the transparencies 22 and 23.

After amplification in a video amplifier 43 both of the analog signals on lines 34 and 35 are fed into each of three correlator and bandpass filter circuits 44, 45 and 46 that separate the signals into bands A, B and C. The circuits 44, 45 and 46 also correlate the video signals producing on lines 47, 48 and 49, cross-correlation signals proportional to the level of correlatable image detail being scanned in the photographs 22 and 23 and produce on lines 51, 52 and 53, orthogonal correlation signals proportional to the degree of relative image detail misregistration existing between the scanned paths. The correlator and bandpass filters 44, 45 and 46 are conventional and do not, per se, form a part of this invention. Suitable circuits of this type are disclosed, for example, in the above noted U.S. Pat. Nos. 2,964,644 and 3,145,303.

The correlation signals on lines 47–53 are fed into a channel selector and separator network 54 that is described in greater detail below. This network 54 separates a cross-correlation signal selected from one of the lines 47, 48 and 49 into $x$ and $y$ cross-correlation components that are fed on lines 55 and 56, respectively, into an automatic control system 57. Also received by the control system 57 on signal line 58 is the orthogonal correlation signal selected from line 51, 52 or 53. The control system 57, which is described in greater detail below, produces on lines 58 and 59 output signals that are applied to the deflection coils of cathode ray tube 26 and on lines 61 and 62 signals that are applied to deflection coils of cathode ray tube 27. Also provided by the control system 57 on lines 63 and 64 are reference signals that are applied to the channel selector and separator network 54.

Figure 2:
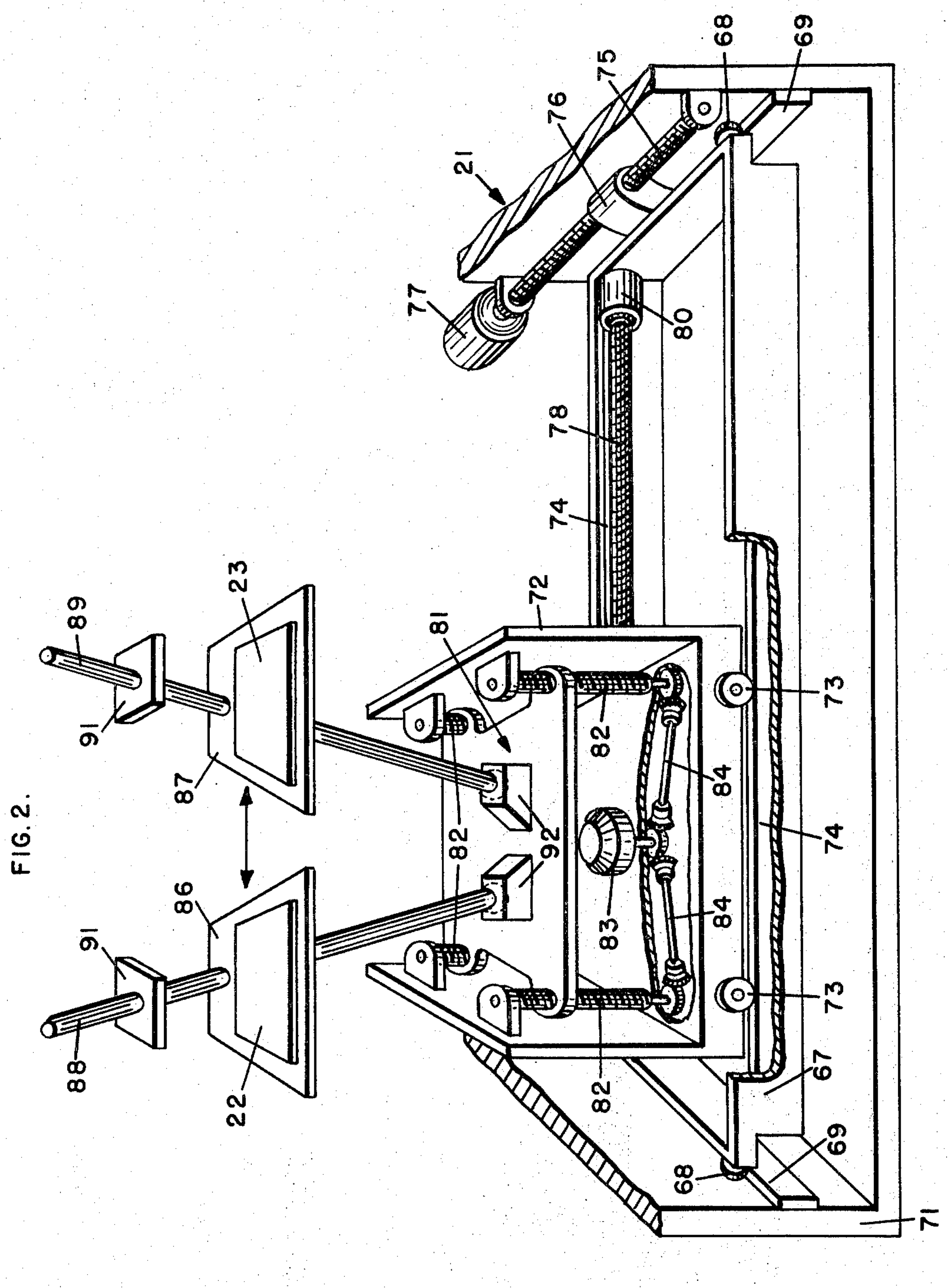
FIG. 2 is a perspective schematic view of the image transformation mechanism 21 shown in FIG. 1.

Shown in FIG. 2 is a schematic perspective view of the dual image transformation system 21 shown in FIG. 1. The transformation system 21 provides controlled movement of the photographic transparencies 22 and 23 in orthogonally related $x$ and $y$-coordinate directions. A $y$-carriage 67 is mounted on rollers 68 for movement along parallel $y$-tracks 69 supported by a frame 71. Similarly, an $x$-carriage 72 is mounted on rollers 73 for movement along $x$-tracks 74 supported by the $y$-carriage 67. Movement of the $y$-carriage 67 is produced by rotation of a $y$-lead screw 75 that engages the internally threaded collar 76. Rotation of the lead screw 75 is controlled by a $y$-servo motor 77. Similarly, movement of the $x$-carriage 72 along tracks 74 is produced by rotation of an $x$-lead screw 78 also driven by a suitable $x$-servo motor 80.

A $z$-carriage 81 is mounted for vertical movement on $z$-lead screws 82 supported by the $x$-carriage 72. Controlled vertical movement of the $z$-carriage 81 is produced by $z$-servo motor 83 coupled to the $z$-lead screws 82 by drive shaft and bevel gear assemblies 84. The photographic transparencies 22 and 23 are mounted, respectively, in photo carriages 86 and 87. Slidably engaging the photo carriages 86 and 87 and providing mechanical coupling thereof to the $z$-carriage 81 are space rods 88 and 89. Opposite ends of the space rods 88 and 89 terminate, respectively, in pivot connections 91 and ball joint assemblies 92 mounted on the $z$-carriage 81. The connections 91 and 92 permit oppositely directed arcuate movement of rods 88 and 89 in response to vertical movement of the $z$-carriage 81. This in turn produces relative rectilinear motion between the transparencies 22 and 23 in the $x$-coordinate direction defined by $x$-rails 74 and of a sense determined by the direction of $z$-carriage 81 movement. The image transformation mechanism 21 is a conventional unit marketed under the trade name Planimat by the Carl Zeiss Company, of Oberkochen, Wurttemburg, Germany. The device is also related to similar transformation systems disclosed in the above noted U.S. Pat. Nos. 2,964,644 and 3,145,303.

In response to appropriate energization of $y$-motor 77 the photo transparencies 22 and 23 move simultaneously with the y-carriage 67 in either a plus or minus $y$-coordinate direction defined by $y$-tracks 69. Similarly, energization of $x$-lead screw 78 produces simultaneous movement of the transparencies in either a plus or minus $x$-direction defined by the $x$-tracks 74. Thus, the mechanism 21 provides selective synchronized two dimensional movement of the transparencies 22 and 23 relative to their respective scanning beams 24 and 25 illustrated in FIG. 1. Conversely, vertical movement of the $z$-carriage 81 in response to energization of $z$-motor 83 results in relative movement between the transparencies 22 and 23 and the scanning beams 24 and 25 as well as between the transparencies themselves. As is well known in the map making field, this relative motion between the transparencies 22 and 23 corrects parallax exsiting between scanned areas thereof. The relative elevation of the $z$-carriage 81 required to eliminate this parallax is directly related to the elevation of the terrain imaged on the stereo photos.

In typical operation, the system shown in FIG. 1 is used to profile a stereo model represented by the stereographic transparencies 22 and 23. For example, to profile automatically in the $y$-coordinate direction, $y$-motor 77 is driven at a predetermined velocity giving rectilinear motion to $y$-carriage 67 and the transparencies 22 and 23 relative to the scanning beams 24 and 25. The $x$-motor 80 forms a part of a positioning servo, that holds the $x$-carriage 72 rigidly in the $x$-coordinate direction. The system is thereby constrained to trace out a straight profile in the $y$-direction and the $x$-position is selected by an automatic stepping system (not shown) controlled, for example, by a conventional limit switch operated when the $y$-carriage 67 reaches one edge of the stereo model. In response to actuation of the limit switch, the direction of rotation of $y$-motor 77 also would be reversed to thereby reverse the traversal direction of the $y$-carriage 67. Obviously, a reversal in roles of the $x$ and $y$-motors would result in the tracing of profiles in the $x$-direction. As a profile is being traced, the $z$-motor 83 is energized as described below by an $x$-parallax error signal that produces vertical movement of the $z$-carriage 81. This adjusts the relative positions of transparencies 22 and 23 in the $x$-direction to eliminate $x$-parallax and thereby provide a direct indication of terrain elevation. Simultaneously, $y$-parallax and other first order distortions are corrected in response to other error signals produced by the control system 57 on lines 58, 59, 61 and 62. Consequently, a viewer utilizing the eyepiece optics 41 and 42 is provided with a corrected stereo presentation of the image scene retained by the transparencies 22 and 23. The correction of $y$-parallax and other distortions can be achieved in various ways. However, a preferred method involves controlled relative distortion of the cathode ray tube rasters as disclosed in U.S. Pat. No. 3,432,674 of Gilbert L. Hobrough issued Mar. 11, 1969.

Figure 3:
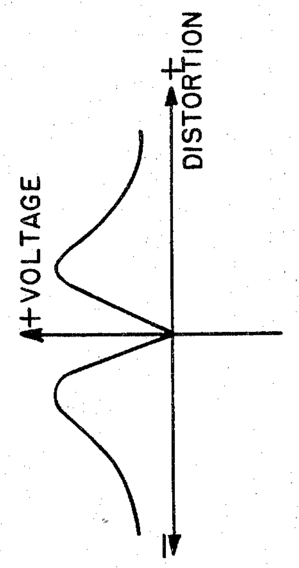
FIG. 3 is a graph illustrating the voltage vs. distortion characteristic of a rectified raw orthogonal correlation signal generated in the system of FIG. 1.

FIG. 3 illustrates the voltage vs. distortion characteristic of the rectified raw orthogonal correlation signals derived by the correlators 44, 45 and 46 on, respectively, signal lines 51, 52 and 53. As shown, the signals have a zero value when the video signals on line 34 and 35 indicate no relative distortion, i.e., when the scanning beams 24 and 25 (FIG. 1) are simultaneously scanning exactly homologous image detail in the photographic transparencies 22 and 23. Conversely, increasing degrees of relative image detail misregistration within the detection range of the system results in increasing values of the raw orthogonal correlation signal. This signal is obtained, for example, by multiplication and subsequent rectification of the analog signals on lines 34 and 35 after introducing a predetermined phase shift therebetween. Thus, the orthogonal correlation signal has an amplitude proportional to the degree of relative image detail misregistration of either sense along the paths scanned in the transparencies 22 and 23 by the scanning beams 24 and 25.

Figure 4:
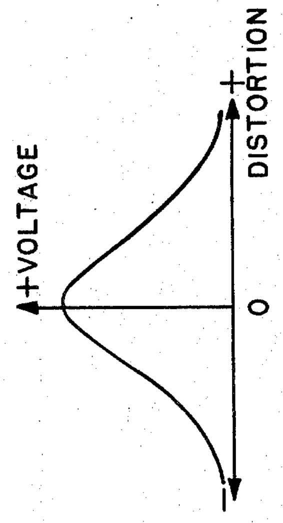
FIG. 4 is a graph illustrating the voltage vs. distortion characteristic of a cross-correlation signal produced by the system of FIG. 1.

FIG. 4 illustrates the voltage vs. distortion characteristic of the cross-correlation signals generated by the correlators 44, 45 and 46 on, respectively, signal lines 47, 48 and 49. As shown, the cross-correlation signal has a maximum value for zero distortion corresponding to good image detail correlation and decreasing signal values for increasing degrees of distortion of either sense. The amplitude of the cross-correlation signal is also dependent upon the inherent quantity of homologous and detectable image detail present along the scanned paths. Thus, a high cross-correlation signal value indicates a high level of correlatable image detail along the simultaneously scanned paths and a low signal value indicates the contrary.

Various types of correlator circuits are known for producing the above mentioned rectified raw orthogonal correlation and cross-correlation signals. Therefore, a detailed description of correlators 44, 45 and 46 is believed unnecessary. Likewise, bandpass filters for separating the signals into separate frequency bands are conventional and deemed to require no further explanation. Examples of circuits suitable for these functions are disclosed in the above noted U.S. Pat. Nos. 2,964,644, 3,145,303 and 3,432,674.

Figure 5:
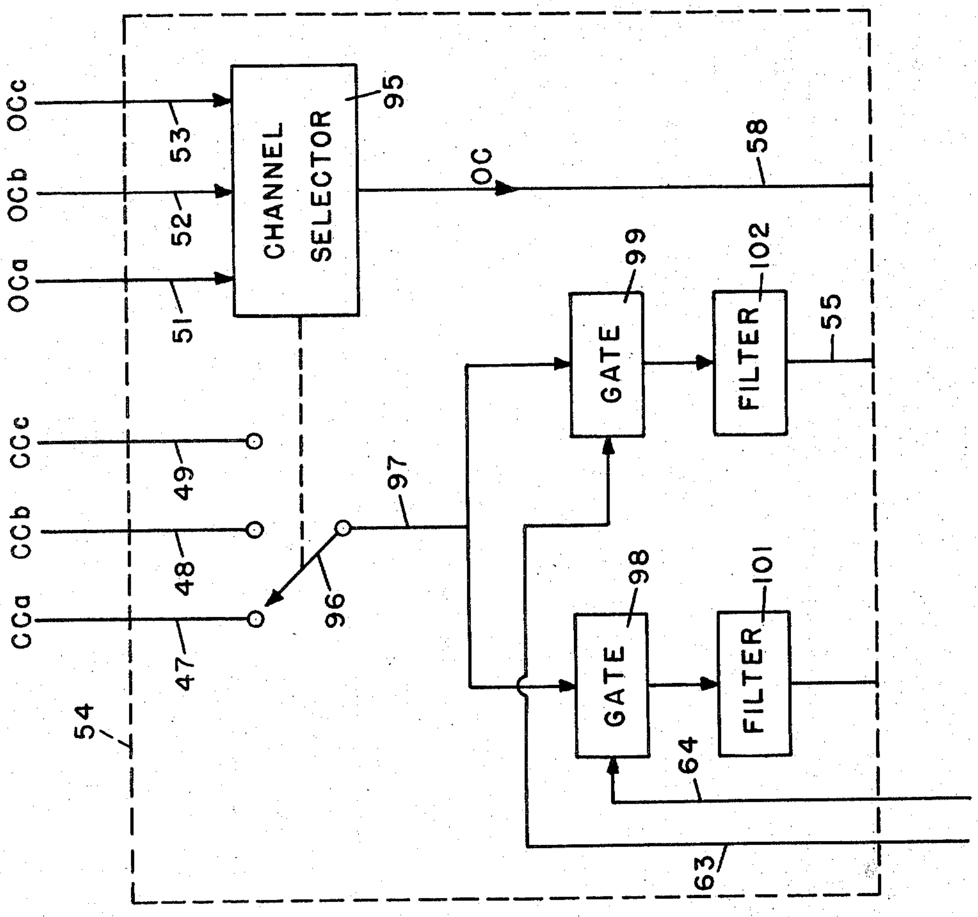
FIG. 5 is a block diagram illustrating the channel selector and separator shown in FIG. 1.

FIG. 5 shows in block circuit form the channel selector and separator circuit 54 shown in FIG. 1. The raw orthogonal correlation signals on lines 51, 52 and 53 are fed into a channel selector circuit 95 that automatically selects one of the signals for transmission on output line 58. Selection is based upon the degree of correlation existing between the images with higher frequency channels selected as image correlation improves. The channel selector 95 does not, per se, form a part of the present invention and consequently will not be described in further detail. However, a channel selector suitable for this application is disclosed in U.S. Pat. No. 3,513,257 of Gilbert L. Hobrough, issued May 19, 1970 and assigned to the assignee of the present application.

Also controlled by the channel selector 95 is a switch 96 that connects line 97 to one of the input lines 47, 48 or 49 carrying the cross-correlation signal corresponding to the selected orthogonal correlation signal transmitted to output line 58. The selected cross-correlation signal output on line 97 is fed into gates 98 and 99 that are gated, respectively, by reference signals on lines 64 and 63 described in greater detail below. After being filtered in filtered circuits 101 and 102 the outputs of gates 98 and 99 appear, respectively, on lines 56 and 55.

Figure 6:
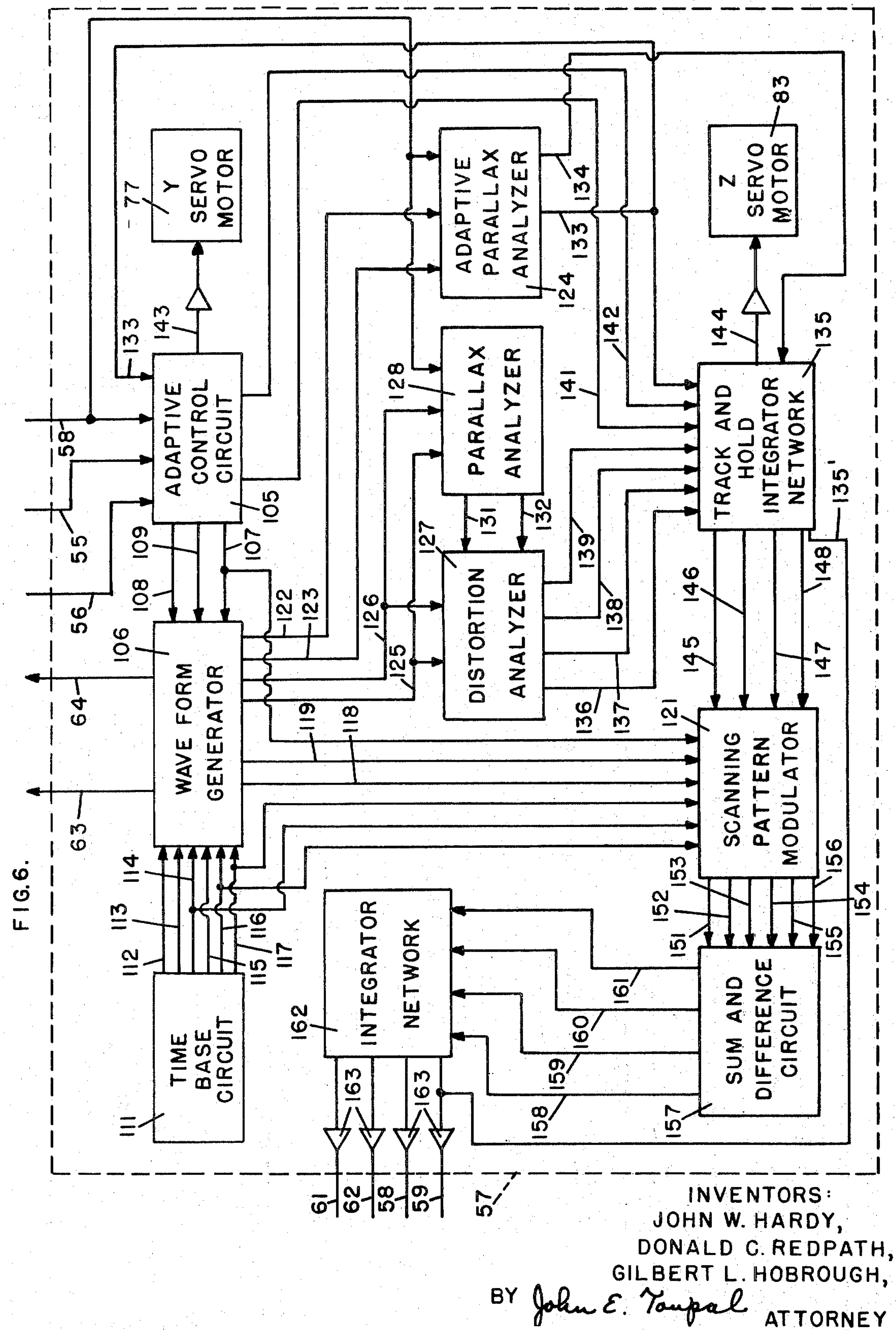
FIG. 6 is a block diagram illustrating the automatic control system shown in FIG. 1.

FIG. 6 illustrates in block circuit form the automatic control system 57 shown in FIG. 1. Receiving the cross-correlation signals from the channel selector 54 on lines 55 and 56 is an adaptive control circuit 105 that feeds control signals to waveform generator 106 on signal lines 107, 108 and 109. Also received by the waveform generator 106 from a time base circuit 111 are reference signals on lines 112–117. Signals produced by the waveform generator 106 on output lines 118 and 119 are fed into a scanning pattern modulator 121 that also receives from the time base circuit 111 the reference signals on lines 114, 116 and 117, and from the adaptive control circuit 105 the control signal on line 107. Additional outputs of the waveform generator 106 on lines 122 and 123 are applied to an adaptive parallax analyzer 124 that also receives the selected orthogonal correlation signal on input line 58. Still other outputs of the waveform generator 106 on lines 125 and 126 are fed into both a distortion analyzer 127 and a parallax analyzer 128, the latter of which also receives the orthogonal correlation signal on input line 58.

Parallax error signals produced by the parallax analyzer 128 are transmitted into the distortion analyzer 127 on lines 131 and 132. Similar parallax error signals are produced by the adaptive parallax analyzer 124 on line 133 and 134. The $x$-parallax signal on line 133 is fed back into the adaptive control circuit 105 and also into a track and hold integrator network 135. The $y$-parallax error signal on line 134 is controlled in track and hold integrator network 135 producing an output signal on line 135. Received by the track and hold integrator network 135 on lines 136–139 are first order distortion error signals from the distortion analyzer 127. Also received by the track and hold integrator 135 on lines 141 and 142 are control signals from the adaptive control circuit 105 that produces on line 143 a servo control voltage for the y-servo motor 77 also shown in FIG. 2. An $x$-parallax error voltage output of the track and hold integrator 135 on line 144 is used as a control voltage for the $z$-servo motor 83 also shown in FIG. 2. The signals from track and hold integrator 135 on lines 145–148 are applied to the scanning pattern modulator 121 that produces output signals on lines 151–156. These signals are algebraically summed in a sum and difference circuit 157 to provide raster control signals on lines 158–161 that are integrated in the integrator network 162. Outputs of the integrator network 162 are amplified by amplifiers 163 producing deflection coil input signals on lines 58, 59, 61 and 62.

Figure 7:
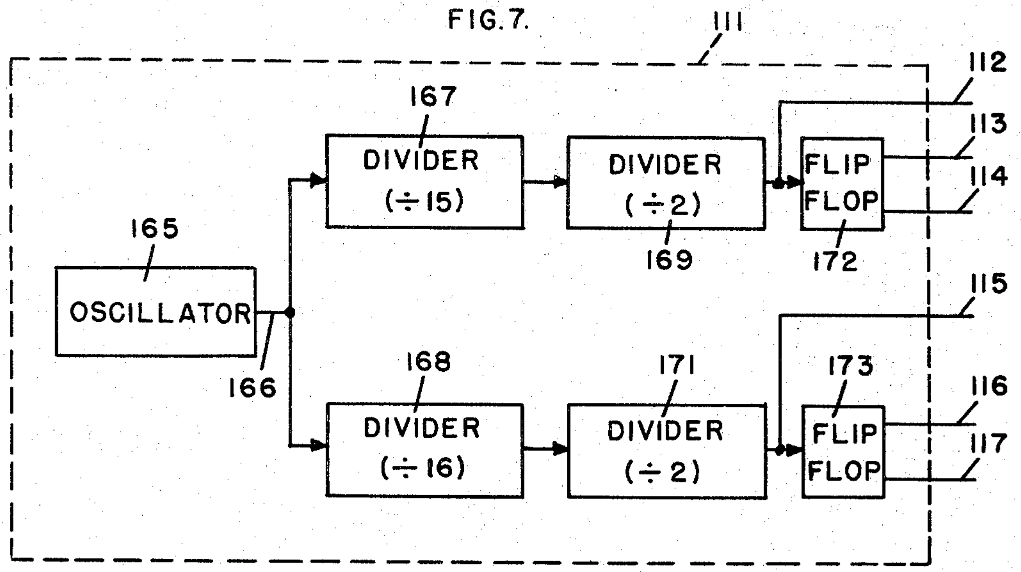
FIG. 7 is a block diagram illustrating the time base circuit shown in FIG. 6.

FIG. 7 shows the time base circuit 111 shown in FIG. 6. An oscillator 165 produces on line 166 a pulsed output the frequency of which is reduced by a factor of 15 in a divider 167 and by a factor of 16 in a divider 168. The output of divider 167 is fed into divider 169 producing on line 112 an output with a pulse frequency reduced by a factor of 2. Similarly, the output of divider 168 is applied to divider 171 that produces on line 115 an output with a pulse frequency reduced by a factor of 2. Receiving the output of divider 169 is a flip flop 172 that produces complementary square wave signals on lines 113 and 114. In the same manner, a flip flop 173 is triggered by the output of divider 171 to produce complementary square wave signals on lines 116 and 117.

Figure 8:
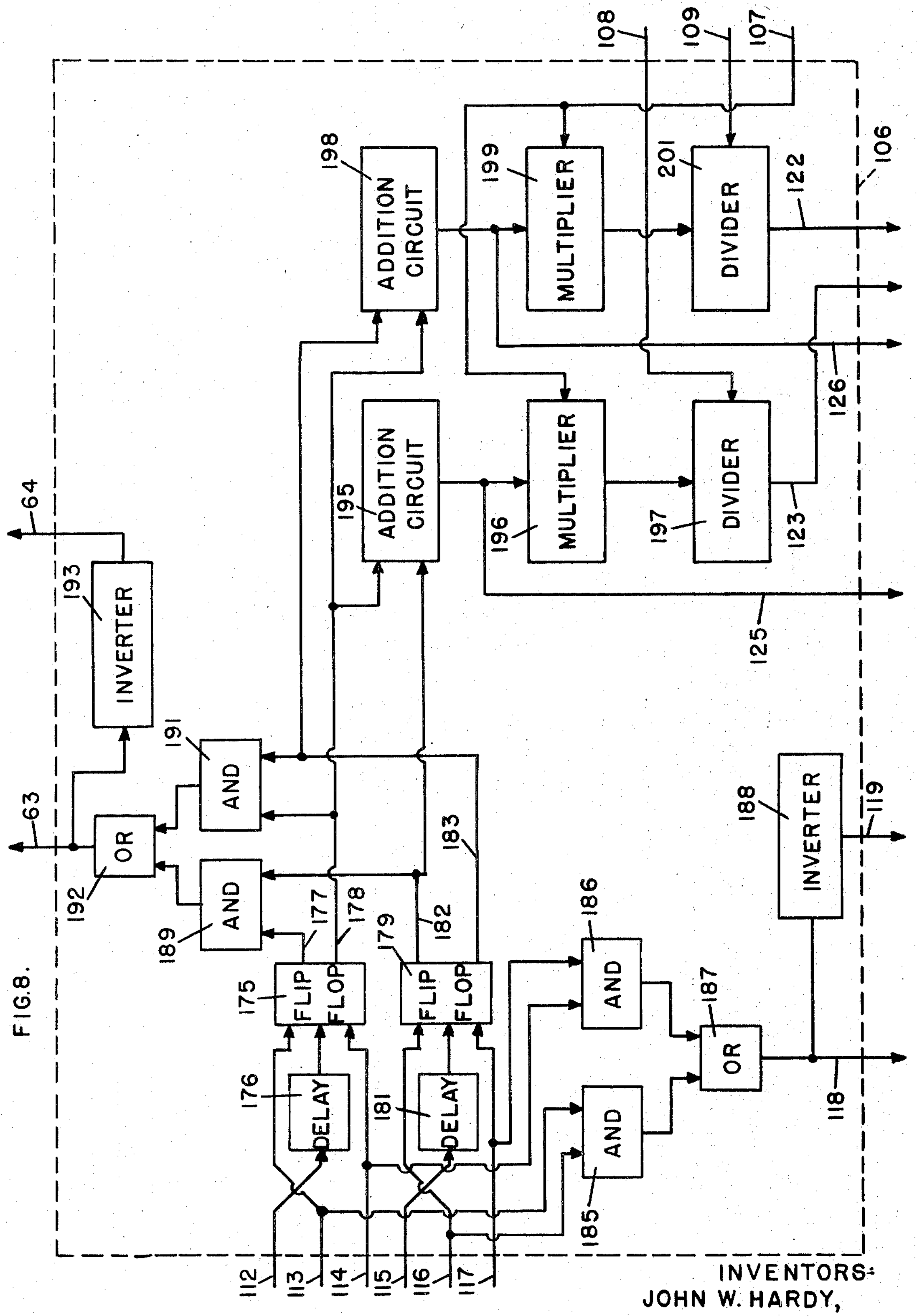
FIG. 8 is a block diagram illustrating the waveform generator shown in FIG. 6.

FIG. 8 illustrates in block circuit form the waveform generator 106 shown in FIG. 6. Received by a flip flop 175 are signals on lines 113 and 114 in addition to the signal on line 112 after delay in a delay circuit 176. The flip flop 175 is triggered by the delayed output of delay circuit 176 to produce on lines 177 and 178 complementary square wave signals, the relative phase relationshp of which is determined by the polarities of the signals on lines 113 and 114. Correspondingly, a flip flop 179 receives the signals on lines 116 and 117 in addition to the signal on line 115 after delay in a delay circuit 181. The outputs of flip flop 179 on lines 182 and 183 also are complementary square wave signals triggered by the delayed output of delay circuit 181 and having relative phase relationships determined by the polarity of the signals on lines 116 and 117.

Signals on lines 113 and 116 also are applied to an AND gate 185 and those on lines 114 and 117 to an AND gate 186. Receiving the outputs of AND gates 185 and 186 is an OR gate 187 that produces a reference output signal on line 118. A complementary reference signal is produced on line 119 by inverting the signal on line 118 in an inverter 188. Another pair of AND gates 189 and 191 receive, respectively, the pairs of signals on lines 177 and 182 and on lines 178 and 183. An OR gate 192 produces a reference signal on line 63 in response to inputs from the AND gates 189 and 191. A complementary reference signal is generated on line 64 by inverting the line 63 signal in an inverter 193.

Addition circuit 195 adds the signals on lines 178 and 182 producing a reference signal on line 125. Also receiving this signal is a multiplier 196 that also receives the input control signal on line 107. The output of multiplier 196 is combined with the control signal on line 108 in a divider 197 providing a modified reference signal on line 123. Similarly, addition circuit 198 adds the signals on lines 178 and 183 producing a reference signal on line 126. This signal is combined with the control signal on line 107 in the multiplier 199 the output of which is combined further with the control signal on line 109 in a divider 201 producing a modified reference signal on line 122.

Figure 9:
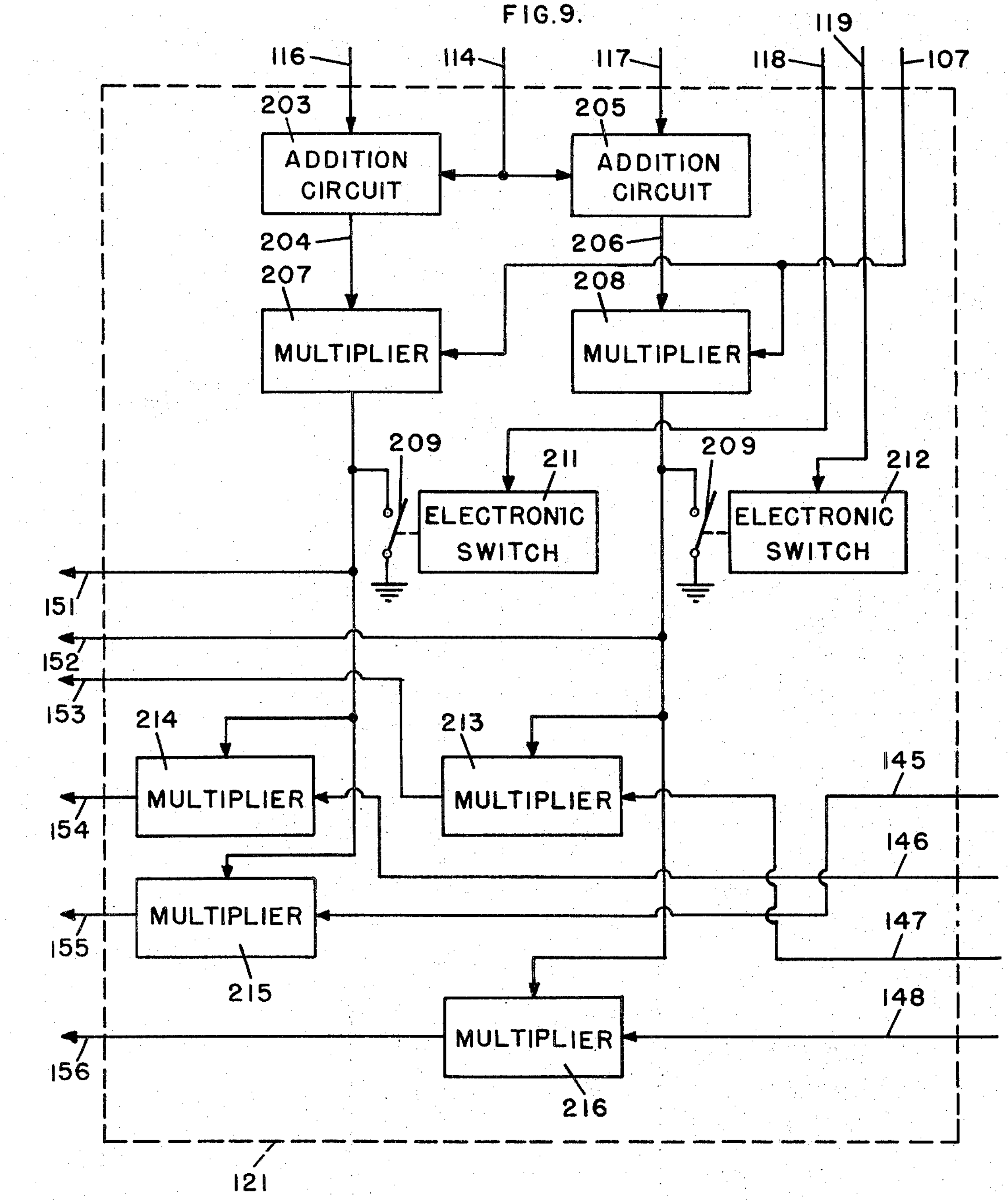
FIG. 9 is a block diagram illustrating the scanning pattern modulator shown in FIG. 6.

FIG. 9 illustrates in block circuit form the scanning pattern modulator 121 shown in FIG. 6. Addition circuit 203 adds the square wave signals on input lines 114 and 116 producing a three-level raster control signal on line 204. Similarly, addition circuit 205 adds the square wave input signals on lines 114 and 117 producing a three-level reference output signal on line 206. The signal on line 204 is combined with the control signal on line 107 in a multiplier 207 producing an amplitude modulated raster control signal on line 151 while the signal on line 206 is combined with the control signal on line 107 in multiplier 208 producing an amplitude modulated raster control signal on output line 152. Each of output lines 151 and 152 are connected to ground by contacts 209 controlled, respectively, by electronic switches 211 and 212 responsive to reference signals on lines 118 and 119. Combining the signals on lines 147 and 152 to produce a modulated error signal on line 153 is a multiplier 213. An identical multiplier 214 combines the signals on lines 146 and 151 producing a modulated error signal on line 154. Similarly, the signals on lines 145 and 151 are combined by multiplier 215 and the signals on lines 148 and 152 are combined in multiplier 216 producing modulated error signals on lines 155 and 156.

Figure 10:
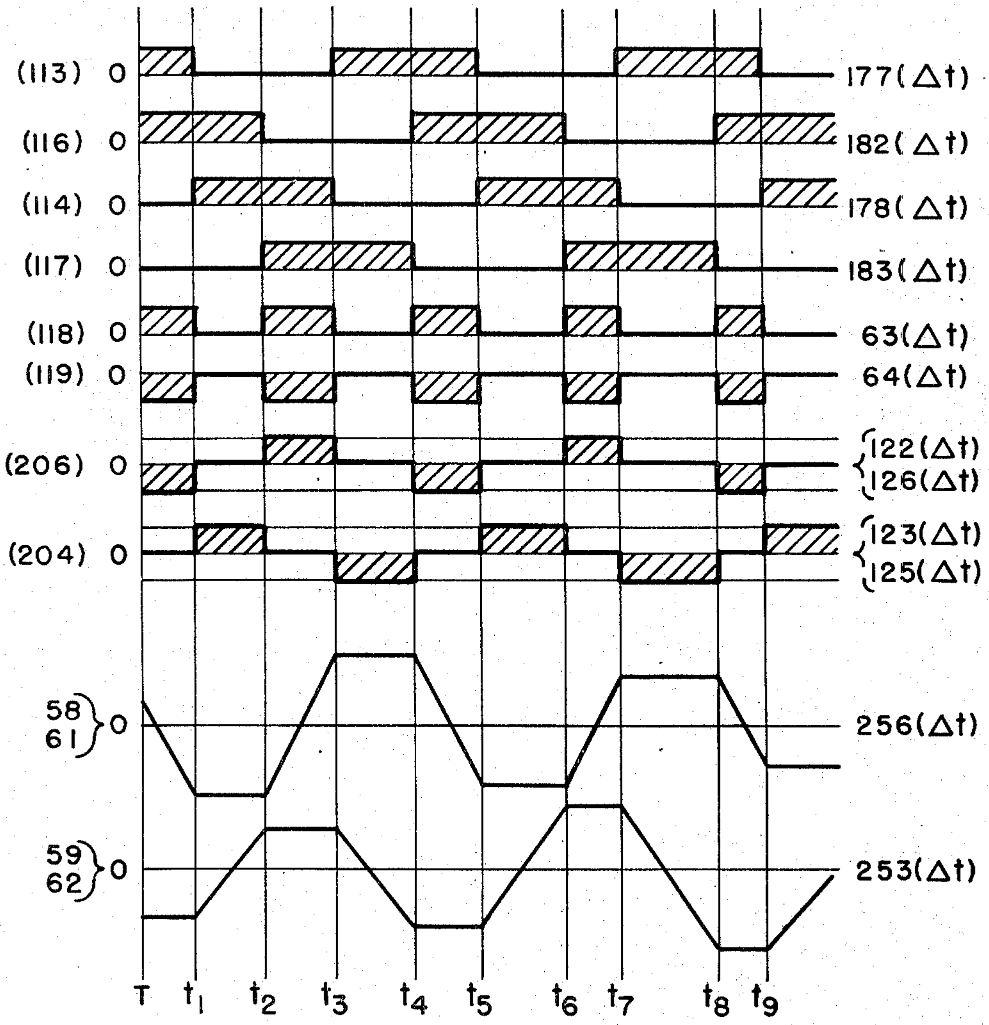
FIG. 10 is a graph showing a plurality of voltage waveforms plotted against time.

Typical waveforms generated on certain lines of the system are illustrated in FIG. 10. Each waveform is identified by the reference numeral applied to the signal line on which it appears and the various waveforms are related to each other in a time sense. As shown, the time base circuit 111 (FIG. 7) produces similar square wave signals on lines 114 and 117. However, because of the slightly different frequency reduction factors introduced by the dividers 167 and 168, the frequency of the square wave signal on line 114 is slightly higher than that of the signal produced on line 117. Also produced in the time base circuit 111 on line 113 and shown in FIG. 10 is the complement of the waveform on line 114, i.e., the voltage on line 113 is positive when the voltage on line 114 has a zero value and is zero when the voltage on line 114 is positive. Similarly produced by time base circuit 111 on line 116 and shown in FIG. 10 is a waveform complementary to that produced on line 117.

In waveform generator 106 (FIG. 8) the AND gate 185 produces a positive output only during periods wherein positive voltages are simultaneously present on signal lines 113 and 116. Likewise, AND gate 186 produces a positive output only during periods wherein positive voltages are simultaneously present on lines 114 and 117. OR gate 187 produces a positive output on signal line 118 in response to reception of positive signal values from either of the AND gates 185 or 186 thereby providing the waveform illustrated in FIG. 10. This signal is inverted by the inverter 188 producing the complement thereof on signal line 119 as also illustrated in FIG. 10.

Figure 11:
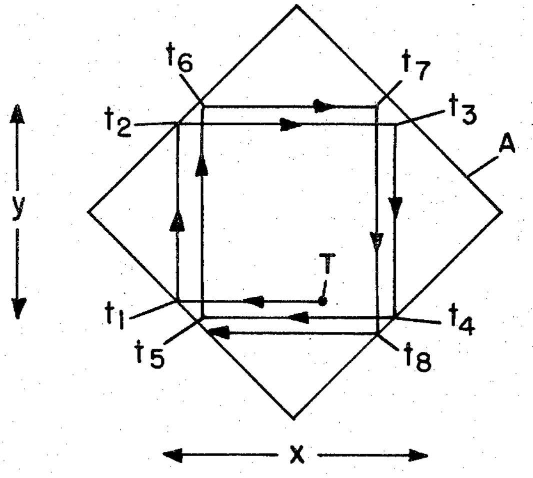
FIG. 11 is a diagrammatic view illustrating the character of the path followed by the spot of a cathode ray tube in tracing a scanning pattern according to the invention.

Addition in the scanning pattern modulator 121 (FIG. 9) of the signals on lines 114 and 116 produces on line 104 the three-level waveform shown in FIG. 10. This waveform has a zero value during periods of positive voltages on either lines 114 and 116, a positive value during periods of positive voltage on both lines 114 and 116 and a negative value during zero voltage periods on both lines 114 and 116. Similarly added by the addition circuit 205 are the signals on lines 114 and 117 producing on signal line 206 the three level waveform also shown in FIG. 10. After amplitude modulation by control signal 107 in the multipliers 207 and 208, respectively, the three level waveforms generated on lines 204 and 206 are fed on lines 151 and 152, respectively, into the sum and difference circuit 157 (FIG. 6). There, as described in greater detail below, the signals are again amplitude modulated by error signals received from the scanning pattern modulator 121 on lines 153–156. Resultant amplitude corrected signals of one sense appear on lines 158 and 159 and corrected signals of the opposite sense appear on output lines 160 and 161. After integration in integrator network 162 (FIG. 6) and a voltage to current amplification by amplifiers 163, these signals result in raster control signals on lines 58 and 59 that are applied to the $x$ and $y$ deflection coils of cathode ray tube 26 (FIG. 1) and raster control signals on lines 61 and 62 that are applied to the deflection coils of cathode ray tube 27. The raster control signals on lines 68, 59 and 61 and 62 have the triangular forms illustrated in FIG. 10 and generate, as described below, rasters with orthogonally related $x$ and $y$ scanning paths as shown in FIG. 11. Orientation of the cathode ray tube deflection coils is such that the $x$ and $y$ scanning directions indicated in FIG. 11 correspond, respectively, to the $x$ and $y$ directions of movement defined by the $x$-rails 74 and $y$-rails 69 shown in FIG. 2.

Referring again to FIG. 10 it will be noted that between times $t_0$ and $t_1$ there exists a decreasing current on raster x-control lines 58 and 61 and a constant current on $y$-control lines 59 and 62. Therefore, the scanning beam spots move between points $t_0$ and $t_1$ (FIG. 11) in a direction with negative $x$ and zero $y$ components. Between times $t_1$ and $t_2$ an increasing current appears on $y$-control lines 59 and 62 and a constant current appears on $x$-control lines 58 and 61. Thus, the spots move between points $t_1$ and $t_2$ (FIG. 11) in a direction with positive $y$ and zero $x$ components. Betwen times $t_2$ and $t_3$, an increasing current exists on $x$-control lines 58 and 61 and a constant current on $y$-control lines 59 and 62. Consequently, as indicated by FIG. 11, the scanning spots move between points $t_2$ and $t_3$ in a direction with positive $x$ and zero $y$ components. Between times $t_3$ and $t_4$ there is a decreasing current on $y$-control lines 59 and 62 and again a constant current on $x$-control lines 58 and 61 thereby producing the path direction indicated between points $t_3$ and $t_4$ in FIG. 11. This path segment has negative $y$ and zero $x$ components. The spots then complete another negative $x$ path segment between points $t_4$ and $t_5$. However, as shown in FIG. 10 the negative current value appearing on $y$-control lines 59 and 62 is greater than the constant current present during time period $t_0$ and $t_1$. Consequently, the path segment $t_4$–$t_5$ is outside the path segment $t_0$–$t_1$ in the scanning area A. Similarly, the constant current applied to $x$-control lines 58 and 61 during time period $t_5$ to $t_6$ is less than that applied during time period $t_0$ to $t_2$. Therefore, the path segment defined by points $t_5$ and $t_6$ in FIG. 11 lies inside the path segment defined by points $t_1$ and $t_2$. This failure of the path segments to coincide directly is caused by the slightly different signal frequencies produced by the dividers 167 and 168 in the time base circuit 11 (FIG. 7). It will be obvious that the scanning pattern illustrated in FIG. 11 will continue with $x$-direction segments of decreasing length and $y$-direction segments of increasing length until a relative phase reversion occurs between the raster control signals on $x$-lines 58–61 and those on $y$-lines 59 and 62. At that time, the $x$-direction segments will begin to progressively increase in length and the $y$-direction segments will begin to decrease in length providing complete coverage of the scanned frame area A.

Thus, the scanning spots directed by cathode ray tubes 26 and 27 onto corresponding areas of the stereo photographs 22 and 23 (FIG. 1) travel along continuous paths comprising alternating orthogonally related path segments. The $x$-direction sets of path segments represented in FIG. 11 by the lines joining point $t_0$ and $t_1$, $t_2$ and $t_3$, $t_4$ and $t_5$, $t_6$ and $t_7$, and $t_8$ and $t_9$ are parallel to the sense of $x$-parallax detected and corrected in the photographic transparencies 22 and 23 while the $y$-direction sets of path segments represented by lines between points $t_1$ and $t_2$, $t_3$ and $t_4$, $t_5$ and $t_6$, and $t_7$ and $t_8$ are parallel to $y$-parallax corrected therein. Furthermore, it will be noted by reference to FIG. 10, that either of the reference signals on lines 118 or 119 indicates in which of those path segment sets the scanning spot is moving. For example, the signal on line 118 is positive during $\pm$ $x$-direction spot movement and zero during — $y$-direction spot movement. Conversely, the signal on line 119 is positive during $\pm$ $y$-direction spot movement and zero during $\pm$ $x$-direction spot movement. The advantages derived from the illustrated scanning pattern and associated reference signals will be described in greater detail below.

Figure 12:
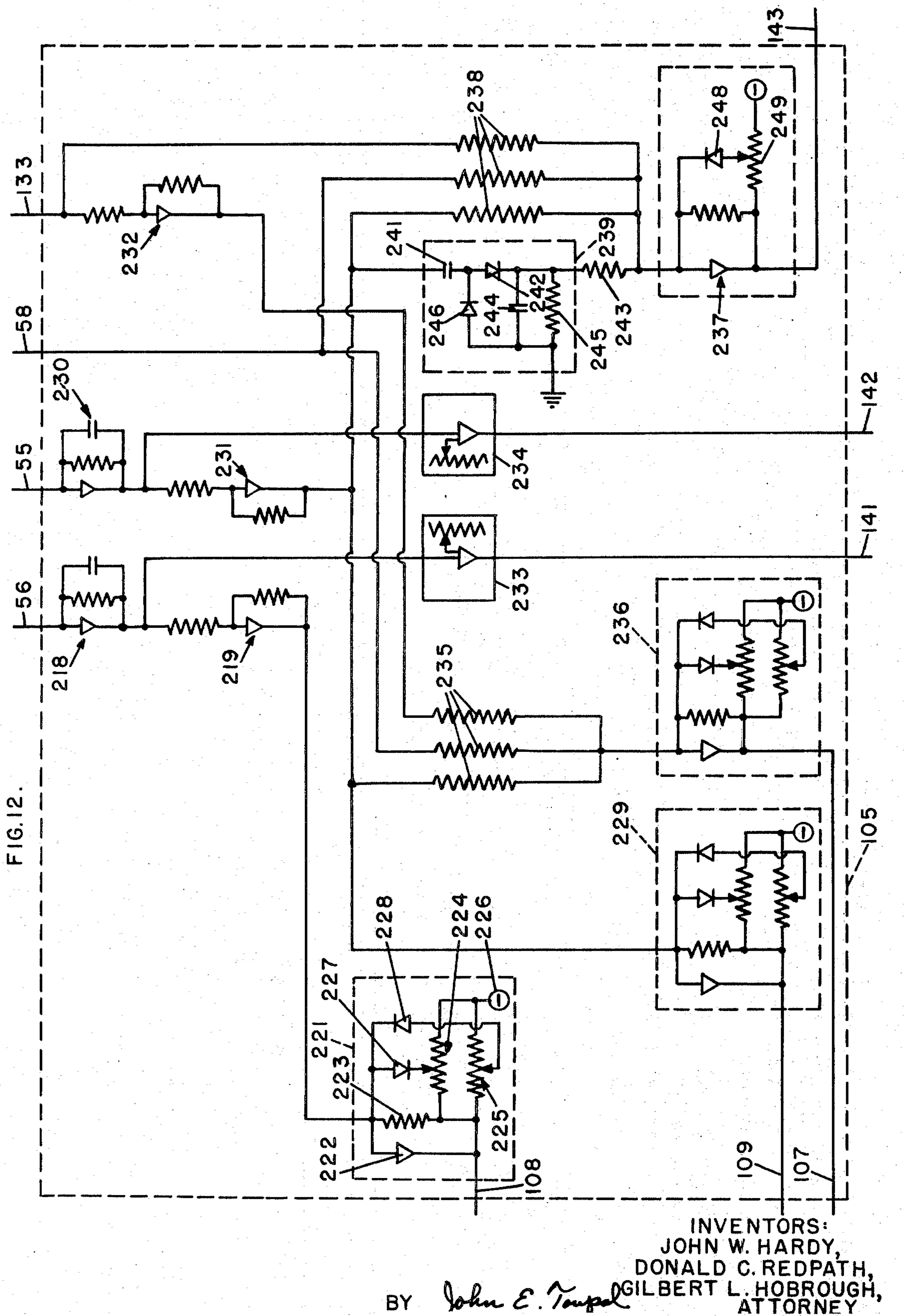
FIG. 12 is a block diagram illustrating the adaptive control circuit shown in FIG. 6.

FIG. 12 illustrates circuit details of the adaptive control circuit 105 shown in FIG. 6. After being smoothed in an integrating amplifier 218 and inverted in an inverter 219 the $y$ cross-correlation component on input line 56 is fed into a limit circuit 221. This circuit produces a $y$-gain control signal on line 108. Included in the limit circuit 221 is an operational amplifier 222 and parallel resistor 223. A pair of potentiometers 224 and 225 are connected between the output of the amplifier 222 and a negative voltage source 226. Connected between the input of the amplifier 222 and the adjustable terminals of, respectively, the potentiometers 224 and 225 are clamping diodes 227 and 228 that provide maximum and minimum outputs for the limit circuit 221.

A limit circuit 229 identical to limit circuit 221 receives the $x$ cross-correlation component on line 55 after smoothing in the integrating amplifier 230 and inversion in an inverter 231. The circuit 229 produces an $x$-gain control signal on line 109. Also receiving the smoothed $y$ and $x$ cross-correlation components are, respectively, threshold circuits 233 and 234 that provide track and hold control signals on lines 141 and 142. Summing resistors 235 combine the parallax error signal on line 133 after inversion in an inverter 232, the orthogonal correlation signal on line 58, and the $x$ cross-correlation output of inverter 231. These combined signals are passed into a limit circuit 236 also identical to the limits circuits 221 and 229. Circuit 236 provides a raster control signal on line 107. A summing amplifier 237 sums the signals applied to resistors 238 including the $x$-parallax signal output on line 133, the orthogonal correlation signal on line 58, and the $x$ cross-correlation output of inverter 231. Also received by summing amplifier 237 from a charging circuit 239 is an output proportional to the rate of change of the $x$ cross-correlation signal output of inverter 231. The charging circuit 239 includes a capacitor 241 and a diode 242 connected in series with the resistor 243. Connected between ground and the junction between diode 242 and resistor 243 is the parallel combination of a compacitor 244 and resistor 245. Another diode 246 is connected between ground and the junction between the capacitor 241 and diode 242. The maximum value of the velocity control signal output on line 143 is established by the clamping diode 248 and potentiometer 249.

Figure 13:
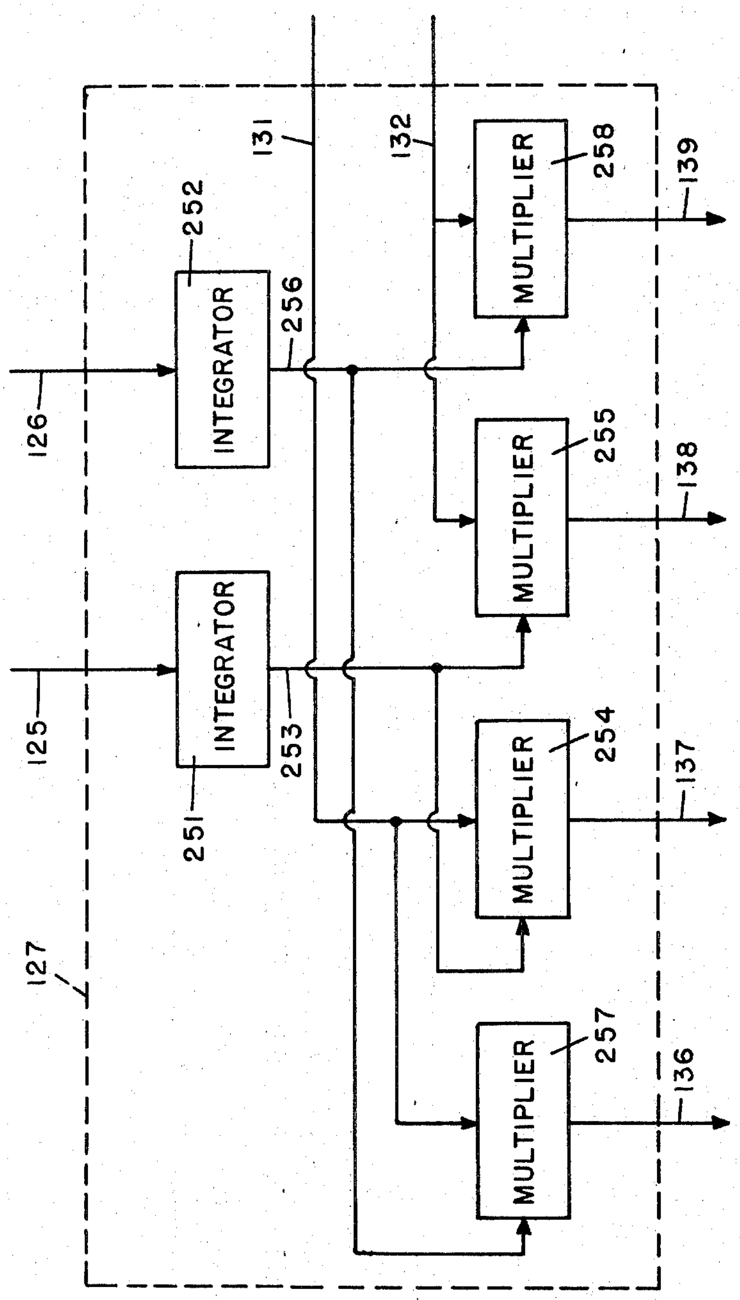
FIG. 13 is a block diagram illustrating the distortion analyzer shown in FIG. 6.

FIG. 13 illustrates in block circuit form the distortion analyzer 127 shown in FIG. 6. Receiving the reference signals on lines 125 and 126 are, respectively, integrator circuits 251 and 252. The output of integrator 251 on line 253 is fed into each of a pair of multipliers 254 and 255. Similarly, the output of integrator 252 on line 256 is fed into each of a pair of multipliers 257 and 258. The multipliers 254 and 257 also receive the input signal on line 131 and produce error signals on, respectively, lines 136 and 137. The input signal on line 132 is applied to each of the multipliers 255 and 258 which produce output error signals on, respectively, lines 138 and 139.

Figure 14:
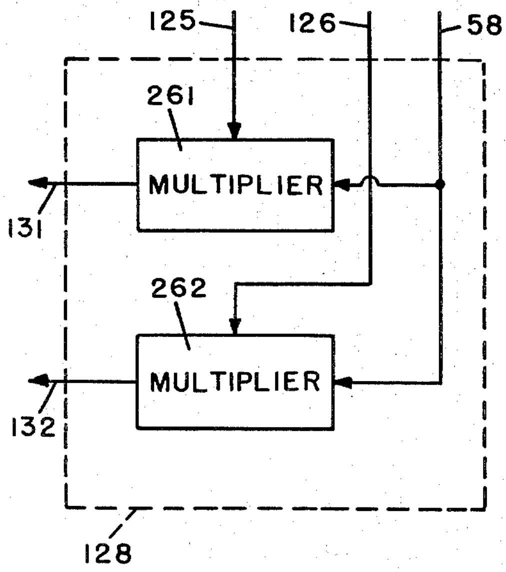
FIG. 14 is a block diagram illustrating the parallax analyzer shown in FIG. 6.

FIG. 14 illustrates in block circuit form the parallax analyzer 128 shown in FIG. 6. A multiplier 261 combines the reference signal on line 125 with the orthogonal correlation signal on line 58 producing an output signal on line 131. Similarly, multiplier 262 combines the reference signal on line 126 with the orthogonal correlation signal on line 58 producing an output signal on line 132.

Figure 15:
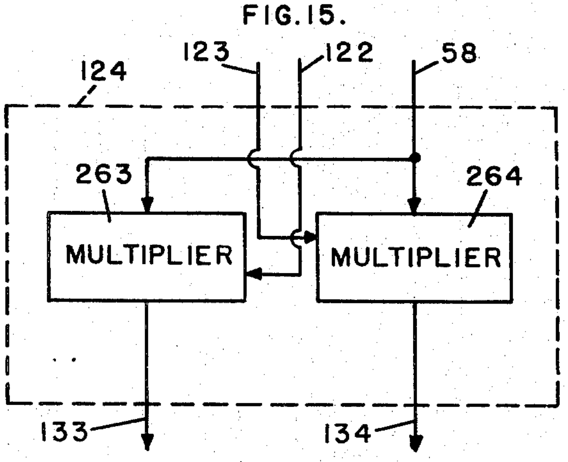
FIG. 15 is a block diagram illustrating the adaptive parallax analyzer shown in FIG. 6.

FIG. 15 shows in block circuit form the adaptive parallax analyzer 124 shown in FIG. 6. A multiplier 263 combines the reference signal on line 122 with the orthogonal correlation signal on line 58 producing an $x$-parallax error signal on line 133. Similarly, multiplier 264 combines the reference signal on line 123 with the orthogonal correlation signal on line 58 producing a $y$-parallax error signal on line 134.

Figure 16:
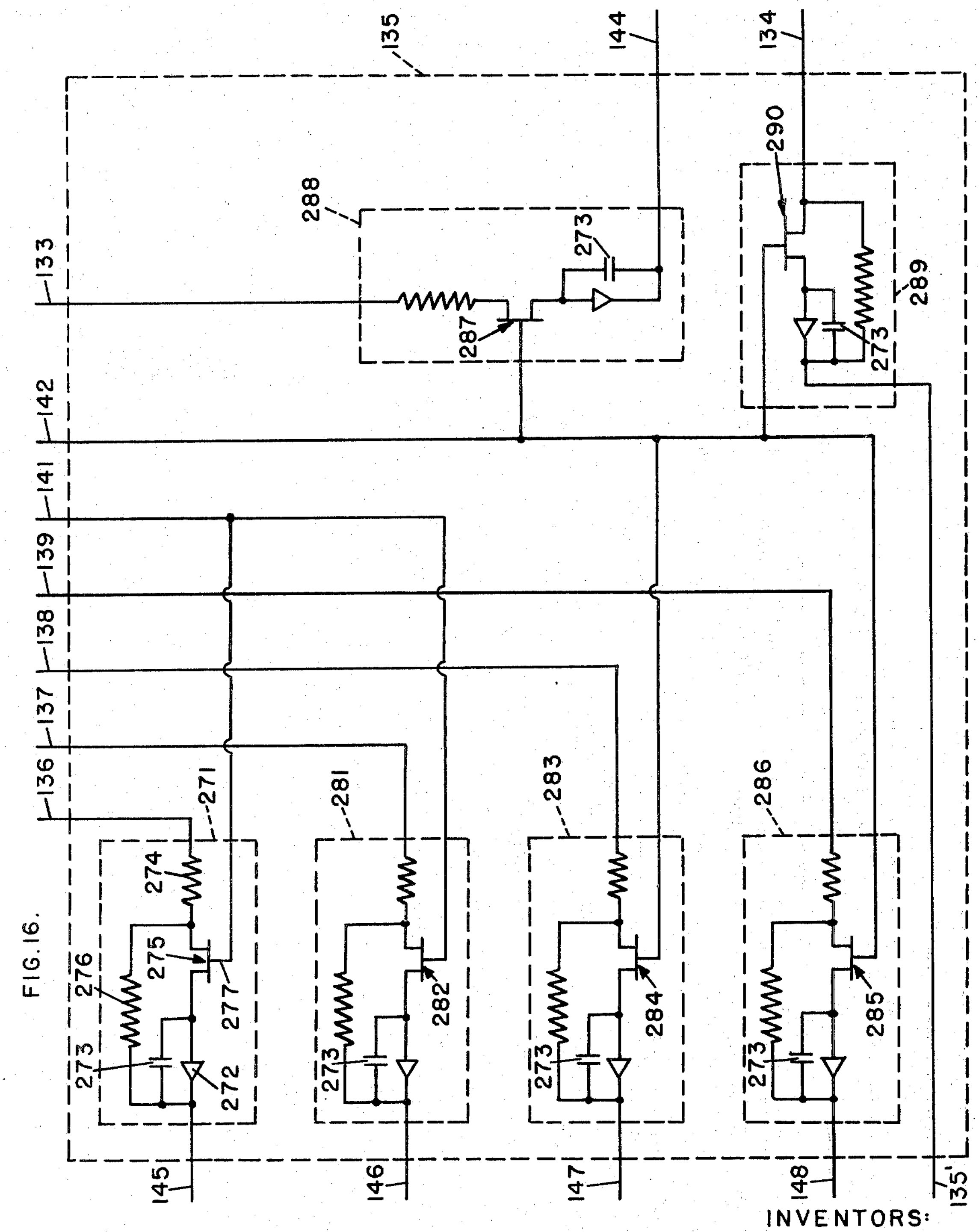
FIG. 16 is a block diagram illustrating the track and hold integrator network shown in FIG. 6.

FIG. 16 illustrates circuit details of the track and hold integrator circuit 135 shown in FIG. 6. The error signal on input line 136 is received by the integrator circuit 271 that produces a controlled output error signal on line 145. Included in the integrator circuit 271 is an operational amplifier 272 and parallel capacitor 273. Connecting the input on signal line 136 to the input of amplifier 272 are the series connected resistor 274 and field effect transistor switch 275. A resistor 276 is connected between the junction of resistor 274 and transistor switch 275 and the output of the amplifier 272. Applied to control electrode 277 of transistor switch 275 is the control signal on line 141. An integrator circuit 281 identical to circuit 271 receives the error signal on line 137 and provides a controlled output error signal on line 146. Also applied to transistor switch 282 in the integrator circuit 281 is the control signal on line 141. Another identical integrator circuit 283 receives the error signal on input line 138 and provides on line 147 an output error signal. This output is controlled by the control signal on line 142 which is applied to transistor switch 284 in the integrator circuit 283. Similarly, integrator circuit 286 transmits the error signal on line 139 to output line 148 under the control of the control signal on line 142 applied to transistor switch 285. Finally, the again identical integrator circuits 288 and 289, respectively, transmit the $x$-parallax error signal on line 133 to output line 144 and the $y$-parallax signal on line 134 to output line 135' under the control of the signal on line 142 applied to control electrodes of transistor switches 287 and 290.

To further explain operation of the invention reference is again made to FIG. 5. The cross-correlation signal selected by channel selector 95 is fed into the gates 98 and 99 which also receive, respectively, gating signals on lines 64 and 63. These signals are produced in the waveform generator 106 shown in FIG. 8. As described above, the flip flop 175 is triggered by trailing edges of the pulses on line 112 received after a slight delay in the delay circuit 176. Thus, the complementary square wave signals generated on lines 177 and 178 have a frequency one half that of the square wave signal on line 112 and with a slightly lagging phase relationship determined by the delay circuit 176. However, since the frequency of the signal on line 112 is exactly twice that of the complementary signals 113 and 114 it will be apparent that the signals produced on lines 177 and 178 have waveforms identical to those illustrated for lines 113 and 114 in FIG. 10. Similarly, the complementary signals produced by the flip flop 179 on lines 182 and 183 have waveforms identical to those illustrated in FIG. 10 for lines 116 and 117 except for the slight time delay established by the delay circuit 181.

The signals on lines 177, 178, 182 and 183 are operated upon by the AND gates 189 and 191, the OR gate 192 and the inverter circuit 193 in exactly the manner, described above, that signals on lines 113, 114, 116 and 117 are operated upon by AND gates 185 and 186, OR gate 187 and the inverter circuit 188. Consequently, the reference signal produced on lines 63 and 64 have waveforms identical to the waveforms illustrated for lines 118 and 119 in FIG. 10, again except for the time lag established by the delay circuits 176 and 181. These delays merely compensate for the inherent time delays introduced by the correlator and bandpass filter circuits 44, 45 and 46 (FIG. 1) so as to insure time synchronization between the various reference signals and the orthogonal and cross-correlation signals produced by those circuits. Thus, for purposes of further circuit analysis, the waveforms illustrated for lines 113 and 114 in FIG. 10 can be considered identical, respectively, to those appearing on lines 177 and 178, those illustrated for lines 116 and 117 identical, respectively, to those appearing on lines 182 and 183, and those illustrated for lines 118 and 119 identical, respectively, to those appearing on lines 63 and 64. These relationships are indicated by the appropriate signal line reference numerals applied to the right hand terminations of the waveforms illustrated in FIG. 10.

Referring back now to FIG. 5, the cross-correlation signal on line 97 is passed to filter 101 when gate 98 is gated by a positive voltage on line 64 and to filter circuit 102 when gate 99 is gated by a positive voltage on line 63. As shown by the waveforms in FIG. 10, the signal on line 63 is positive only during periods of voltage value transition on signal lines 58 and 61 which periods correspond to scanning spot movement in either the plus or minus *x*-direction. Similarly, the signal on line 64 is positive only during periods of voltage value transition on lines 59 and 62 which correspond to periods of scanning spot movement in either the plus or minus *y*-direction. Therefore, the signal component derived by the separator 54 on line 55 represents correlation quality during periods of scan in the *x*-coordinate direction and the component derived on line 56 represents correlation quality during periods of scan in the *y*-coordinate direction.

The *x* and *y* cross-correlation components on lines 55 and 56 along with the orthogonal correlation signal on line 58 are fed into the adaptive control circuit 105 shown in FIG. 12. Receiving the *y*-component after smoothing and inversion in circuits 218 and 219, respectively, is the limit circuit 221 that produces on line 108 a *y*-gain control signal of proportional value within the maximum and minimum limits determined by adjustment of the potentiometers 224 and 225. In the same manner, the *x*-component after smoothing and inversion in circuits 230 and 231, respectively is applied to the limit circuit 229 that produces on line 109 an *x*-gain control signal of proportional value within predetermined maximum and minimum limits. The *x* and *y* gain signals on lines 107 and 108, respectively, are used to control *x* and *y*-loop gains as described below.

The *y* and *x* cross-correlation components are also applied, respectively, to the threshold detector circuits 233 and 234 after being smoothed by the amplifiers 218 and 230. When the value of the *y* cross-correlation component is above a predetermined threshold value, a control signal appears on output line 141. Similarly, when the amplitude of the *x* cross-correlation component is above a predetermined threshold value, a control signal is present on output signal line 142. As described below, these signals modify the *x* and *y* correction outputs in the track and hold integrator network 135.

Also receiving the *x* cross-correlation component in addition to the orthogonal correlation signal on line 58 and the *x*-parallax error signal on line 133 after inversion by inverter 232 is the summation amplifier and limit circuit 236. The raster size control signal output of the limit circuit 236 on line 107 is proportional to the degree of *x*-parallax indicated by the signal on line 133 and inversely proportional to both correlation quality in the *x*-direction as indicated by the *x* cross-correlation component on line 55 and the magnitude of raw parallax indicated by the orthogonal correlation signal on line 58. As described below this signal controls raster size in the scanning pattern modulator 121 (FIG. 6) and *x* and *y* loop gains in the waveform generator 106.

The summing amplifier and limit circuit 237 receives the *x* cross-correlation component, the orthogonal correlation signal on line 58 and the *x*-parallax error signal on line 133, all applied to summing resistors 238. Within a predetermined maximum range determined by clamping diode 248 and potentiometer 240, the output of summing amplifier 237 on line 143 is a traversing velocity control signal with a value proportional to the quality of *x*-direction correlation as indicated by the *x* cross-correlation component and inversely proportional to both the orthogonal correlation signal on line 58 and the *x*-parallax error signal on line 133. As illustrated in FIG. 6, the velocity control signal on line 143 is applied through a servo amplifier to the *y*-servo motor 77 shown also in FIG. 2. Thus, the *y*-carriage 67 is driven in the *y*-coordinate direction established by the *y*-rails 69 at a velocity inversely proportional to the degree of raw distortion indicated by the orthogonal correlation signal and to the degree of *x*-parallax indicated by the *x*-parallax error signal and proportional to correlation quality in the *x*-direction of scan as indicated by the *x* cross-correlation component.

Also applied to summing amplifier 237 via resistor 243 is the output of charging circuit 239 which functions as a differentiator. Thus, the output to resistor 243 reflects the rate of change of the $x$ cross-correlation input signal. Since this signal also controls the amplifier output on line 143, it will be obvious that the velocity of $y$-servo motor 77 is also influenced by the rate at which $x$-correlation quality changes. Consequently, during periods of rapid correlation quality change the velocity of the $y$-direction traverse can be quickly altered in magnitude or even caused to reverse direction.

Referring now to the parallax analyzer 128 shown in FIG. 14, the orthogonal correlation signal on line 58 is operated upon in the conventional four-quadrant multiplier circuits 261 and 262 producing on lines 131 and 132, respectively, error signals that represent $y$ and $x$-parallax. The output of multiplier 261 is determined by the polarity of the $y$-reference signal on line 125 and the output of the multiplier 262 is determined by the polarity of the $x$-reference signal on line 126. As shown by FIG. 10, the signal on reference line 125 is positive during periods of scan in the positive $y$-direction, zero during periods of $x$-direction scan of either sense, and negative during periods of negative $y$-direction scan. The reference signal on line 125 eliminates those portions of the orthogonal correlation signal representing relative distortion in the $x$-direction of scan and compensates for the polarity reversals caused by opposite $y$-scan directions. Thus, the $y$-parallax error signal on line 131 indicates both degree and sense of $y$-parallax existing between the compared images. Similarly, the $x$-reference signal on line 126 has a negative value during periods of negative $x$-direction scan, a zero value for either sense of $y$-direction scan, and a positive value during periods of positive $x$-direction scan. The reference on line 126 eliminates those portions of the orthogonal correlation signal representing relative distortion in the $y$-scan direction and compensates for the opposite directions of $x$-direction scan to produce on line 132 a signal indicating both the degree and sense of $x$-parallax existing between the compared images.

The $x$ and $y$-parallax signals on lines 132 and 131 are applied to the distortion analyzer 127 shown in FIG. 13. Also received by the distortion analyzer 127 on lines 125 and 126 are $y$ and $x$ reference signals that are integrated, respectively, by the integrator circuit 251 and 252. The resultant waveforms on lines 253 and 256 are, as indicated in FIG. 10, identical in form to the deflection signals produced on, respectively, lines 59 and 62 and lines 58 and 61. Combined in the four-quadrant multiplier 258 are the $x$-parallax error signal on line 132 and the reference signal on line 256 which is negative during periods of $x$-direction spot movement in the left half of the scanning area A (FIG. 11) and positive during $x$-direction spot movement in the right half of the scanning area. Therefore, the output signal of multiplier 258 on line 139 represents magnitude and sense of $x$-scale error existing between the compared images. Applied to the four-quadrant multiplier 255 are the $x$-parallax error signal on line 132 and the reference signal on line 253 which, as shown in FIG. 10, is negative during periods of spot movement in the negative $x$-direction and positive during spot movement in the positive $x$-direction. Accordingly, the output of multiplier 255 on line 138 respresents both magnitude and sense of $x$-skew error existing between the compared images. The four-quadrant multiplier 254 receives the $y$-parallax error signal on line 131 and the reference signal on line 253 which is negative during periods of $y$-direction spot movement in the lower half of the scanning area A and positive during periods of $y$-direction spot movement in the upper half of the scanning area A. Thus, the output signal of multiplier 254 on line 137 represents both magnitude and sense of $y$-scale error existing between the compared images. Finally, the four-quadrant multiplier 257 receives the $y$-parallax error on line 131 and the reference signal on line 256 which is negative during periods of scanning spot movement in the positive $y$-direction and positive during periods of scanning spot movement in the negative $y$-direction. Consequently, the output of the multiplier 257 on line 136 represents magnitude and sense of $y$-skew error existing between the compared images. A more thorough discussion of the first-order distortions $x$-scale, $x$-skew, $y$-sale and $y$-skew and methods for their detection appears in the above noted U.S. Pat. No. 3,432,674. Additional control of the error signals on lines 136–139 occurs in integrater network 135 (FIG. 6), as described in greater detail below.

Reference is now made to the adaptive parallax analyzer 124 shown in FIG. 15. The orthogonal correlation signal on line 58 is operated upon in four-quadrant multipliers 263 and 264 by the reference signals on lines 122 and 123, respectively. This produces $x$ and $y$-parallax error signals on output lines 133 and 134 in exactly the manner described above in connection with parallax analyzer 128 shown in FIG. 14. However, as described above, the reference signals on lines 122 and 123 are amplitude modulated in waveform generator 106 (FIG. 8) by the raster control signal on input line 107 and the $y$ and $x$-loop gain control signals on, respectively, lines 108 and 109. The multiplier circuits 196 and 199 increase the amplitudes of the reference signals on lines 125 and 126, respectively, in response to increasing values of the raster control signal on line 107. Conversely, the divider circuits 197 and 201 decrease the amplitudes of the associated reference signals in response to increasing values of the loop gain control signals on lines 108 and 109, respectively. Thus, the amplitude of the error signal output of adaptive parallax analyzer 124 on line 133 is proportional to both the level of x-parallax existing between the compared images and the value of the raster control signal on line 107, and inversely proportional to the value of the $x$-loop gain control signal on line 109. The output on line 134 is an error signal with an amplitude proportional to both $y$-parallax existing between the compared images and the value of the raster control signal on line 107, and inversely proportional to the value of the $y$-loop gain control signal on line 108.

Referring now to the track and hold integrater network 135 shown in FIG. 16, integrator circuits 271 and 281 normally pass onto output lines 145 and 146, respectively, the $y$-skew and y-scale error signals received from the distortion analyzer 127 on signal lines 136 and 137. However, if correlation quality in the $y$-direction of scan as indicated by the $y$ cross-correlation component falls below a predetermined level established by the threshold of detector circuit 233 (FIG. 12), control voltage is eliminated from hold-control line 141. The elimination of this control voltage opens transistor switches 275 and 282 of integrator circuits 271 and 281, respectively. This in turn prevents further changes in the line 145 and line 146 output voltages which are maintained at existing levels by the charged capacitors 273. Similarly, integrator circuits 283 and 286 normally pass onto output lines 147 and 148, respectively, the *x*-skew and *x*-scale error signals received on lines 138 and 139 from distortion analyzer 127. However, in response to a decrease in *x*-direction correlation quality, as indicated by the *x* cross-correlation component, to below a minimum level established by the threshold of detector circuit 234 (FIG. 12), control voltage is eliminated from the hold-control line 142. This in turn opens the field effect transistor switches 284 and 285 in integrator circuits 283 and 286 preventing further changes in line 147 and line 148 output voltages which are maintained at previous values by the charged capacitors 273.

Also received by track and hold integrator network 135 are the x and y parallax error signals derived by adaptive parallax analyzer 124 (FIG. 15) on lines 133 and 134, respectively. These signals are normally passed by integrator circuits 288 and 289 (FIG. 16) on lines 144 and 135', respectively, to the *z*-servo motor 83 and output line 59 of the integrator network 162 (FIG. 6). Again, however, a decrease in *x*-direction correlation quality to below a predetermined level results in elimination of control voltage from hold-control line 142. This opens the transistor switches 287 and 290 preventing further change on line 135' and line 144 output voltages which are maintained at existing values by charged capacitors 273.

As described above, the *z*-motor 83 produces vertical movement of *z*-carriage 81 (FIG. 2) and corresponding rectilinear relative movement between the transparencies 22 and 23 so as to correct *x*-parallax existing therebetween. The *x*-parallax is represented partially by the amplitude of the error signal input to integrator 288 on line 133. However, as noted above, the signal on line 133 has an amplitude proportional also to the raster control signal on line 107 (FIG. 12) and inversely proportional to the value of the *x*-gain control signal on line 109 in turn established in control circuit 105 (FIG. 12) by *x*-direction correlation quality as indicated by the *x* cross-correlation component. Thus, the gain of the *x*-parallax transformation system is dependent upon both the size of the scanning raster utilized and upon correlation quality in the *x*-direction of scan as indicated by the *x* cross-correlation component. Furthermore, the absence of a given minimum level of correlation quality in the *x*-direction results in the above holding action that prevents changes in a then applied magnitude and sense of *x*-parallax correction.

The error signals produced by the track and hold integrator network 135 (FIG. 16) on lines 145–148 are fed into the scanning pattern modulator 121 shown in FIG. 9. There, the *x*-reference signal on line 152 is amplitude modulated by the *x*-skew error signal on line 147 and the *x*-scale error signal on line 148 in, respectively, the four-quadrant multiplier circuits 213 and 216. This results in output signals on lines 153 and 156 having three level waveforms time related to the reference signal on line 152 but with amplitudes respectively proportional to detected *x*-skew error and *x*-scale error. Similarly, the *y*-reference signal on line 151 is amplitude modulated by the *y*-scale error signal on line 146 and the *y*-skew error signal on line 147 in, respectively, the four-quadrant multipliers 214 and 215. The resultant output signals on lines 154 and 155 have three level waveforms time related to the reference signal on line 151 but with amplitudes respectively proportional to detected *y*-scale error and *y*-skew error.

Figure 17:
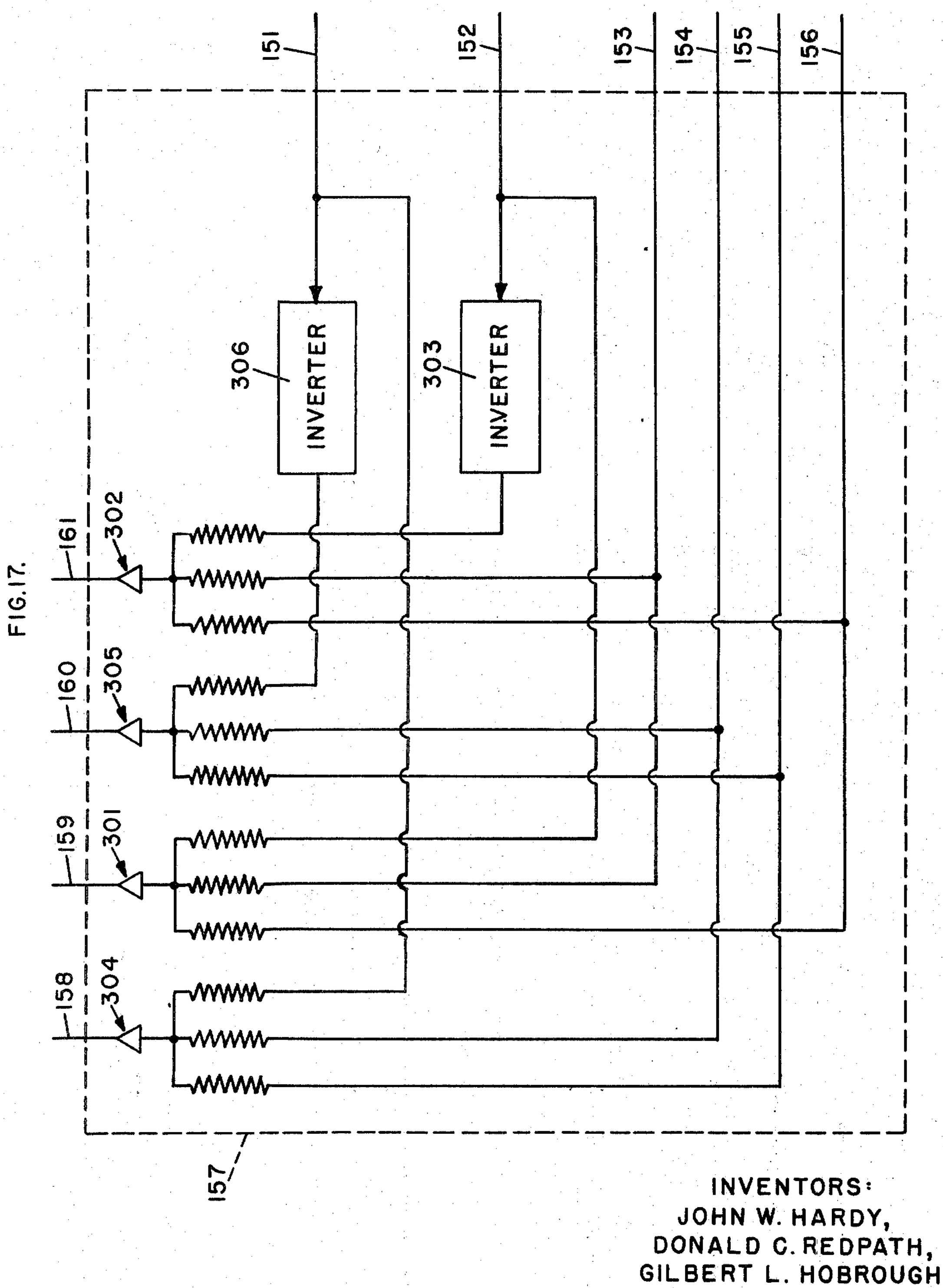
FIG. 17 is a schematic diagram of the sum and difference circuit shown in FIG. 6.

FIG. 17 shows in block diagram form the sum and difference circuit 157 shown in FIG. 6. Applied to a summing amplifier 301 are the *x*-raster control signal on line 152, the *x*-skew error signal on line 153, and the *x*-scale error signal on line 156. The same three signals are applied also to a summing amplifier 302 after polarity reversal, however, of the reference signal on line 152 in an inverter circuit 303. The resultant output signals on lines 159 and 161 have waveforms of the three level type illustrated for line 206 in FIG. 10 but with amplitude corrections of opposite sense introduced by the error signals on lines 153 and 156. Another summing amplifier 304 receives the *y*-raster control signal on line 151, the *y*-scale error signal on line 154 and the *y*-skew error signal on line 155. Similarly, applied to a summing amplifier 305 are these same signals after polarity reversal of the *y*-raster control signal on line 151 in an inverter circuit 306. Again, the output signals on lines 158 and 160 have waveforms of the three level type illustrated for line 204 in FIG. 10 but with amplitude corrections of a degree determined by the error signals on lines 154 and 155 and of opposite sense because of the inverter 306.

The error signal modulated voltages on lines 157 and 161 are integrated in the integrator network 162 (FIG. 6) producing on lines 58 and 61 the triangular type waveforms shown in FIG. 10. These currents are applied, respectively, to the *x*-deflection coils of cathode ray tubes 26 and 27. Integration of the error signal modulated voltages on lines 158 and 160 produces on lines 59 and 62 the triangular waveforms also shown in FIG. 10. The line 59 and line 62 signals are applied, respectively, to the y-deflection coils of cathode ray tubes 26 and 27. The deflection signals on lines 58, 59, 61 and 62 distort the scanning rasters produced by tubes 26 and 27 in a manner tending to eliminate the *x*-scale, *x*-skew, *y*-scale and *y*-skew errors represented by the corresponding error signals. Because of the opposite senses of correction introduced in sum and difference circuit 157, the distortion of the rasters also are of opposite sense. For example, an *x*-scale error signal on line 156 indicating a larger *x*-scale for the image on transparency 22 than for the image on transparency 23 would tend to enlarge the raster *x*-scale of tube 27 and reduce the raster *x*-scale of tube 26. A further description of these raster corrections appears in the above noted U.S. Pat. No. 3,432,674.

Y-parallax is corrected by combining the *y*-parallax error signal on line 135' with *y*-deflection voltage on line 59 as shown in FIG. 6. The bias introduced by the line 135' signal shifts the raster generated by cathode ray tube 26 so as to produce relative rectilinear movement between the areas scanned in the two images. This relative movement is in the direction defined by *y*-rails 69 (FIG. 2) and of a sense tending to correct *y*-parallax indicated by the parallax error signal on line 135'.

Thus, the present invention provides a dual image registration system that automatically controls scanning pattern size in dependence upon correlation quality in the *x*-direction of scan as indicated by the *x* cross-correlation component, raw levels of misregistration indicated by the orthogonal correlation signal, and levels of *x*-parallax indicated by the derived *x*-parallax signal. The raster size control signal is generated in the adaptiive control circuit 105 (FIG. 6) and used to amplitude modulate the raster reference signals in the scanning pattern modulator 121. Also automatically controlled is profiling speed in dependence upon both correlation quality and rate of change of correlation quality in the $x$-direction of scan, raw levels of misregistration, and levels of $x$-parallax. The profiling velocity control signal is generated in the adaptive control circuit 105 (FIG. 6) and applied to the $y$-servo motor 77. Further provision is made for automatically controlling electrical gain of the $x$-parallax and $y$-parallax correction loops. The $x$-loop gain is controlled by correlation quality in the $x$-direction of scan and by raster size while $y$-loop gain is controlled by correlation quality in the $y$-direction of scan and also by raster size. These control signals are generated in adaptive control circuit 105 (FIG. 6) and used in waveform generator 106 to amplitude modulate $x$ and $y$-reference signals applied to the adaptive parallax analyzer 124. Finally, all $x$ and $y$ corrective transformations are automatically stopped in response to predetermined conditions indicated by the levels of the $x$ and $y$ cross-correlation components.

During normal operation correlation is initially established using image detail of low spatial frequency to secure a good pull-in capability, progressing to higher spatial frequencies to obtain higher accuracy. This selection is made by the channel selector 95 shown in FIG. 5. The size of the scanning patterns are similarly reduced as correlation quality improves, and the profiling speed is increased. A sudden drop in correlation quality produces a rapid shift to correlation of lower spatial frequencies, to a larger scanning pattern and to a slower profiling rate. In extreme cases the $y$-servo will cause the machine to stop profiling or even to back up while correlation is restored.

A primary feature of the correlation system is that while the scanning patterns are completely amorphous in their ability to detect image displacements, the quality of correlation is monitored separately in the $x$ and $y$-directions of scan producing distinct $x$ and $y$-quality signals. Because of selective use of the separate correlation quality components loss of correlation in either axis separately does not produce failure, but merely results in a hold of the corresponding transformations at existing values until correlation in that axis is reestablished. Other correlation quality functions also are made more relevant by use of the appropriate cross-correlation component.

Another significant feature of the invention is the use of Lissajous type scanning patterns formed by a limited number of scanning lines per frame. Since the basic object of the system is to generate transformation error signals rather than to produce visible presentations, a small number of lines introduces no visual problems and facilitates the use of a desirable high frame rate. In addition, a larger scanning spot can be utilized for given sized rasters thereby providing more light for generation of video signals. According to the invention the oscillator 165 (FIG. 7) is selected to provide raster signals on lines (58, 61) and (59, 62) with frequencies $f_1$ and $f_2$ and wherein $f_1/f_2$ expressed in its lowest terms is $p/q$ where $p$ and $q$ are integers and $(p + q)$ is less than 100. In a specifically preferred embodiment $p$ equals 16 and $q$ equals 15 so that $(p + q)$ is equal to 31.

Obviously, many modifications and variations of the present invention are possible in light of the above teachings. It is to be understood, therefore, that the invention can be practiced otherwise than as specifically described.

What is claimed is:

1. A multiple image registration system comprising scanning means for directing scanning patterns onto corresponding areas of a pair of similar images; signal generating means for producing a first analog signal representing variable detail along the path scanned in one of said images, and a second analog signal representing variable detail along the path scanned in the other of said images; correlating means for deriving from said first and second analog signals an orthogonal correlation signal having an amplitude proportional to the degree of image detail misregistration along said scanned paths, and a cross-correlation signal having an amplitude proportional to the level of correlatable image detail along said scanned paths; waveform generating means providing for said scanning means raster signals that produce continuous scanning paths formed by alternating substantially orthogonally related crossing path segments; and actuating means comprising an $x$-parallax correction means responsive to said orthogonal correlation signal and adapted to produce a first direction of relative rectilinear movement between the areas scanned in said images, and wherein one set of said orthogonally related path segments are parallel to said first direction of relative rectilinear movement produced by said $x$-parallax correction means.

2. A multiple image registration system according to claim 1 wherein said waveform generating means further provides a scanning direction reference signal that indicates which of the orthogonally related sets of path segments is being scanned.

3. A multiple image registration system according to claim 2 wherein said correlating means separates from said cross-correlation signal an $x$-component derived during periods of scan along one of said path segment sets.

4. A multiple image registration system according to claim 3 including control circuit means adapted to vary the size of said scanned areas responsive to said $x$-component of said cross-correlation signal.

5. A multiple image registration system according to claim 3 including traversing means adapted to simultaneously produce a given magnitude of relative velocity between both of said images and the scanning patterns directed thereon; and said control circuit means is further adapted to vary said given magnitude of relative velocity in response to the value of said $x$-component of said cross-correlation signal.

6. A multiple image registration system according to claim 5 wherein said control circuit is further adapted to vary said given magnitude of relative velocity in response to the rate of change in the value of said $x$-component of said cross-correlation signal.

7. A multiple image registration system according to claim 3 wherein said correlating means further separates from said cross-section signal a $y$-component during periods of scan along the other of said path segment sets.

8. A multiple image registration system according to claim 7 wherein said actuating means further comprises $y$-parallax correction means responsive to said orthogonal correlation signal and adapted to produce between the areas scanned in said images a second direction of relative rectilinear movement orthogonally related to said first direction of movement produced by said x-parallax correction means.

9. A multiple image registration system according to claim 8 including holding circuit means adapted to render said x-parallax correction means non-responsive to said orthogonal correction signal in response to a predetermined condition indicated by the value of said x-component of said cross-correlation signal.

10. A multiple image registration system according to claim 9 wherein said holding circuit means is further adapted to render said y-parallax transformation means non-responsive to said orthogonal correlation signal in response to a given condition indicated by the value of said y-component of said cross-correlation signal.

11. A multiple image registration system according to claim 10 wherein said actuating means further comprises first order transformation means responsive to said orthogonal correlation signal and adapted to correct relative first order distortion between the scanned images.

12. A multiple image registration system according to claim 11 wherein said holding circuit means is further adapted to render said first order transformation means non-responsive to said orthogonal correlation signal in response to given conditions indicated by the values of said x and y-components of said cross-correlation signal.

13. A multiple image registration system according to claim 12 including traversing means adapted to simultaneously produce a given magnitude of relative velocity between both said images and the scanning patterns directed thereon; and said control circuit means is further adapted to vary said given magnitude of relative velocity in response to the value of said x-component of said cross-correlation signal.

14. A multiple image registration system according to claim 13 wherein said control circuit means is further adapted to vary the size of said scanning patterns in response to said x-component of said cross-correlation signal.

15. A multiple image registration system according to claim 3 including holding circuit adapted to render said x-parallax correction means non-responsive to said orthogonal signal in response to a predetermined condition indicated by the value of said x-component of said cross-correlation signal.

16. A multiple image registration system according to claim 15 including control circuit means adapted to vary the size of said scanning patterns in response to said x-component of said cross-correlation signal.

17. A multiple image registration system according to claim 16 wherein said x-parallax correction means comprises a closed loop system, and said control circuit means is further adapted to vary the gain of said closed loop system in response to said x-component of said said cross-correlation signal.

18. A multiple image registration system according to claim 17 wherein said control circuit means is further adapted to vary the gain of said closed loop system in response to changes in the size of said scanning patterns.

19. A multiple image registration system according to claim 18 wherein said control circuit means is further adapted to vary the size of said scanning patterns in response to said orthogonal correlation signal.

20. A multiple image registration system according to claim 17 including traversing means adapted to simultaneously produce a given magnitude of relative velocity between both said images and the scanning patterns directed thereon; and said control circuit means is further adapted to vary said given magnitude of relative velocity in response to the value of said x-component of said cross-correlation signal.

21. A multiple image registration system according to claim 20 wherein said control circuit is further adapted to vary the size of said scanning patterns in response to said orthogonal correlation signal.

22. A multiple image registration system according to claim 21 wherein said correlating means further separates from said cross-correlation signal a y-component during periods of scan along the other of said path segment sets.

23. A multiple image registration system according to claim 22 wherein said actuating means further comprises a y-parallax transformation means responsive to said orthogonal correlation signal and adapted to produce between the areas scanned in said images a second direction of relative rectilinear movement orthogonally related to said first direction of movement produced by said x-parallel correction means.

24. A multiple image registration system according to claim 23 wherein said holding circuit means is further adapted to render said y-parallax transformation means non-responsive to said orthogonal correlation signal in response to a given condition indicated by the value of said y-component of said cross-correlation signal.

25. A multiple image registration system according to claim 24 wherein said y-parallax transformation means is a closed loop system and said control circuit means is further adapted to vary the gain of said closed loop y-parallax transformation means in response to said y-component of said cross-correlation signal.

26 A multiple image registration system according to claim 25 wherein said control circuit means is further adapted to vary the gain of said closed loop y-parallax transformation means in response to changes in the size of said scanning patterns.

27. A multiple image registration system comprising scanning means for directing scanning patterns onto corresponding areas of a pair of similar images; signal generating means for producing a first signal representing variable detail along the path scanned in one of said images; and a second analog signal representing variable detail along the path scanned in the other of said images; waveform generating means providing for said scanning means raster signals of frequencies $f_1$ and $f_2$ that produce a Lissajous scanning pattern with crossing sets of scanning paths and wherein $f_1/f_2$ expressed in its lowest terms is $p/q$ where $p$ and $q$ are integers and $(p + q)$ is less than 100, said raster signals producing continuous scanning paths formed by alternating orthogonally related path segments, and said waveform generating means further providing a scanning direction reference signal that indicates which of said sets of orthogonally related paths is being scanned; and correlating means for deriving from said first and second analog signals an orthogonal correlation signal having an amplitude proportional to the degree of image detail misregistration along said scanned paths, said correlating means including means for deriving from said first and second analog signals a cross-correlation signal having an amplitude proportional to the level of correlatable detail along said scanned paths, and means for separating from said cross-correlation signal an x-component derived during periods of scan along one of said path segment sets.

28. A multiple image registration system according to claim 27 including control circuit means depicted to vary the size of said scanning patterns in response to said $x$-component of said cross-correlation signal.

29. A multiple image registration system according to claim 27 including traversing means adapted to simultaneously produce a given magnitude of relative velocity between both of said images and the scanning patterns directed thereon; and control circuit means adapted to vary said given magnitude of relative velocity in response to the value of said $x$-component of said cross-correlation signal.

30. A multiple image registration system according to claim 27 including actuating means comprising an $x$-parallax correction means responsive to said orthogonal correlation signal and adapted to produce a first direction of relative rectilinear movement between the areas scanned in said images, and wherein one of said orthogonally related path segment sets is parallel to said first direction of relative rectilinear movement produced by said actuating means.

31. A multiple image registration system according to claim 30 including holding circuit means adapted to render said $x$-parallax correction means non-responsive to said orthogonal correlation signal in response to a predetermined condition indicated by the value of said $x$-component of said cross-correlation signal.

32. A multiple image registration system according to claim 31 wherein said correlating means further separates from said cross-correlation signal a $y$-component during periods of scan along the other of said path segment sets.

33. A multiple image registration system according to claim 32 wherein said actuating means further comprises a y-parallax transformation means responsive to said orthogonal correlation signal and adapted to produce between the areas scanned in said images a second direction of relative rectilinear movement orthogonally related to said first direction of movement produced by said $x$-parallax correction means.

34. A multiple image registration system according to claim 33 wherein said holding circuit means is further adapted to render said $y$-parallax transformation means non-responsive to said orthogonal correlation signal in response to a given condition indicated by the value of said $y$-component of said cross-correlation signal.

35. A multiple image registration system comprising scanning means for directing scanning patterns onto corresponding areas of a pair of similar images; signal generating means for producing a first analog signal representing variable detail along the path scanned in one of said images, and a second analog signal representing variable detail along the path scanned in the other of said images; traversing means for simultaneously producing a given magnitude of relative velocity between both said images and said scanning patterns directed thereon; correlating means for deriving from said first and second analog signals on orthogonal correlation signal having an amplitude proportional to the degree of image detail misregistration along said scanned paths, and a cross-correlation signal having an amplitude proportional to the level of correlatable image detail along said scanned paths; actuating means for producing relative rectilinear movements between the areas scanned in said similar images in response to said orthogonal correlation signal; and holding circuit means independent of said traversing means and operatively coupled to said actuator means and adapted to prevent said actuating means from responding to said orthogonal correlation signal in response to a predetermined condition indicated by said cross-correlation signal.

* * * * *